US012759569B2

(12) United States Patent
Jung et al.

(10) Patent No.: US 12,759,569 B2
(45) Date of Patent: Oct. 13, 2026

(54) VEHICLE FOR PREGNANT WOMAN AND METHOD OF CONTROLLING SAME

(71) Applicants: Hyundai Motor Company, Seoul (KR); Kia Corporation, Seoul (KR)

(72) Inventors: Sung Il Jung, Busan (KR); Jae Keun Lee, Seoul (KR); Hui Un Son, Suwon-Si (KR); Sung Bae Jeon, Hwaseong-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 32 days.

(21) Appl. No.: 18/387,354

(22) Filed: Nov. 6, 2023

(65) Prior Publication Data

US 2024/0351598 A1 Oct. 24, 2024

(30) Foreign Application Priority Data

Apr. 18, 2023 (KR) ........................ 10-2023-0050717

(51) Int. Cl.
*B60W 50/10* (2012.01)
*B60W 50/08* (2020.01)

(52) U.S. Cl.
CPC .......... *B60W 50/10* (2013.01); *B60W 50/085* (2013.01); *B60W 2540/221* (2020.02)

(58) Field of Classification Search
CPC ...................... B60W 50/085; B60W 2540/221
See application file for complete search history.

(56) References Cited

U.S. PATENT DOCUMENTS

| | | | |
|---|---|---|---|
| 6,309,031 B1 | 10/2001 | Crombez et al. | |
| 8,165,747 B2 | 4/2012 | Ueno et al. | |
| 8,321,111 B2 | 11/2012 | Ueno et al. | |
| 9,340,213 B2 | 5/2016 | Kollegger et al. | |
| 11,040,619 B1 * | 6/2021 | Martin | B60R 16/037 |
| 2018/0194365 A1 * | 7/2018 | Bae | G08G 1/16 |
| 2019/0276044 A1 | 9/2019 | Bae et al. | |
| 2020/0269857 A1 | 8/2020 | Tsuji et al. | |
| 2021/0232643 A1 | 7/2021 | Ricci | |
| 2022/0011132 A1 | 1/2022 | Jia et al. | |
| 2022/0089063 A1 * | 3/2022 | Fields | B60R 21/01554 |

(Continued)

FOREIGN PATENT DOCUMENTS

| | | |
|---|---|---|
| CN | 107571819 | 1/2018 |
| JP | 2006-017678 | 1/2006 |
| JP | 2007-010634 | 1/2007 |

(Continued)

*Primary Examiner* — Imran K Mustafa
(74) *Attorney, Agent, or Firm* — MORGAN, LEWIS & BOCKIUS LLP

(57) ABSTRACT

A vehicle provides various functions for a pregnant woman and a method of controlling the same. The method of supporting vehicle driving for a pregnant woman may include determining whether to enter a driving support control for the pregnant woman based on at least one of an entry command or an input biometric information of a driver, determining a control function to be activated among predetermined control functions in the driving support control for the pregnant woman based on the at least one of the entry command or the biometric information when entering the driving support control for the pregnant woman, and performing the determined control function.

20 Claims, 25 Drawing Sheets

(56) References Cited

U.S. PATENT DOCUMENTS

| | | | | |
|---|---|---|---|---|
| 2022/0196423 | A1* | 6/2022 | Homma ............ | G01C 21/3484 |
| 2024/0034352 | A1* | 2/2024 | Kim .................. | B60W 60/0013 |

FOREIGN PATENT DOCUMENTS

| | | |
|---|---|---|
| JP | 4059194 | 3/2008 |
| JP | 2018-043569 | 3/2018 |
| JP | 6581128 | 9/2019 |
| JP | 2019-202055 | 11/2019 |
| JP | 2021-059222 | 4/2021 |
| JP | 7002355 | 2/2022 |
| KR | 10-1542982 | 8/2015 |
| KR | 10-1645164 | 7/2016 |
| KR | 10-2017-0093817 | 8/2017 |
| KR | 10-1766772 | 8/2017 |
| KR | 10-2018-0006336 | 1/2018 |
| KR | 10-1929303 | 12/2018 |
| KR | 10-2361551 | 2/2022 |
| KR | 10-2368812 | 2/2022 |
| KR | 10-2024-0169376 | 3/2024 |

* cited by examiner

FIG. 5

Pregnant woman mode control in first trimester (body protection priority control)

<Function priority>
1) Acceleration/deceleration limit
2) Set speed limit when recognizing front braking situation
3) Fatigue reduction route recommendation <Correction sensitivity>
1) Acceleration/deceleration Factor_LV2
2) APS, BPS correction Factor_LV2
3) Braking situation recognition speed limit_LV3
4) Steering manipulation correction_LV1

<Computational sensitivity>
1) Vehicle pitching sensor_LV3
2) Longitudinal/lateral acceleration sensor_LV3

Pregnant woman mode control in second trimester (drivability + stability)

<Function priority>
1) Acceleration/deceleration limit
2) APS, BPS correction
3) Fatigue reduction route recommendation <Correction sensitivity>
1) Acceleration/deceleration Factor_LV1
2) APS, BPS correction Factor_LV1
3) Braking situation recognition speed limit_LV1
4) Steering manipulation correction_LV2

<Computational sensitivity>
Calculated value_all LV1

→ Context-based control default value

Pregnant woman mode control in third trimester (body assistance control)

<Function priority>
1) APS, BPS correction
2) Driving convenience function for pregnant woman
3) Limit acceleration/deceleration <Correction sensitivity>
1) Factor_LV3: Acceleration/deceleration Factor _LV3
2) APS, BPS correction Factor_LV3
3) Braking situation recognition speed limit_LV3
4) Steering manipulation correction_LV3

<Computational sensitivity>
1) Handle torque sensor_LV3
2) Vehicle pitching sensor_LV3
3) Longitudinal/lateral acceleration sensor_LV3

| Location of rest area | Level | Fatigue index reduction |
|---|---|---|
| 20km after section with fatigue index of 90 or higher | Level 1 | 60 |
| 10km before and after section with fatigue index of 90 or higher | Level 3 | 100 |
| 20km before section with fatigue index of 90 or higher | Level 2 | 80 |

FIG. 20
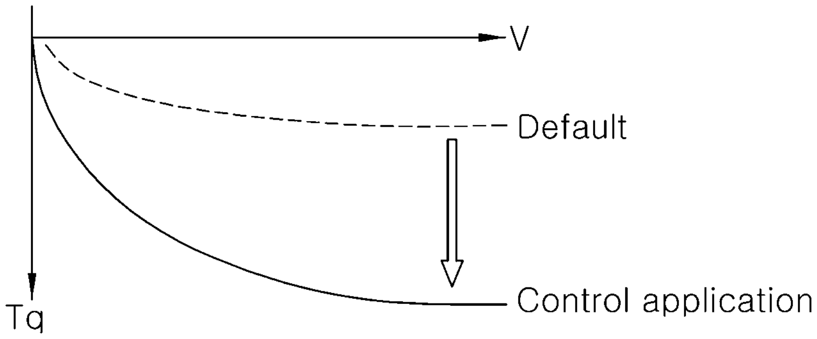
<Regenerative amount control on steel road>
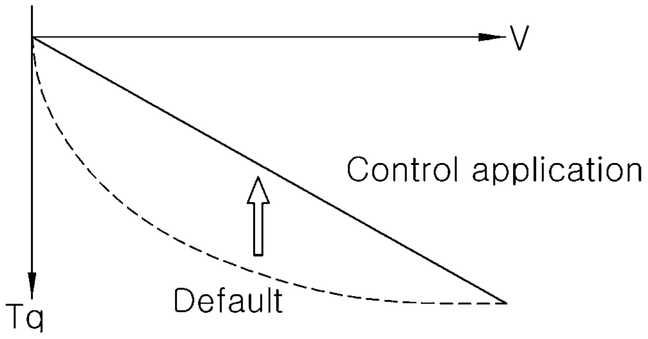
<Change rate control in case of sudden change in creep torque>

VEHICLE FOR PREGNANT WOMAN AND METHOD OF CONTROLLING SAME

CROSS REFERENCE TO RELATED APPLICATIONS

The present application claims priority to Korean Patent Application No. 10-2023-0050717, filed on Apr. 18, 2023, the entire contents of which is incorporated herein for all purposes by this reference.

BACKGROUND OF THE PRESENT DISCLOSURE

Field of the Present Disclosure

The present disclosure relates to a vehicle providing various functions for a pregnant woman and a method of controlling the same.

Description of Related Art

In many countries, it is compulsory to wear a seat belt while driving a vehicle. However, when a pregnant woman wears a general safety belt, it may press her spine and fetus, and depending on a situation, she may be in a more dangerous situation than when not wearing it. Accordingly, a pregnant woman is an exception to the application of the obligation to wear a seat belt, and a type of seat belt that does not press the abdomen is being studied.

Meanwhile, when sitting in a driver's seat, a pregnant woman may recline a seatback or adjust a seat position in a direction away from a steering wheel to relieve pressure of a seat belt and reduce pressure applied to the abdomen. In the instant case, the body is further away from accelerator and brake pedals as well as the steering wheel, so more effort is required to apply the same amount of manipulation to the pedals compared to a normal seat position. Furthermore, there are statistics indicating that the concentration of driving may decrease due to the influence of hormones, and the risk of accidents greatly increases especially in the case of drivers in their second trimester of pregnancy.

In response to the above situation, auxiliary devices such as a pedal extender, a seat belt for a pregnant woman, a belt guide, and a shock absorption protector that facilitate pedaling even in a seat position farther from the pedal than usual have been devised. However, these auxiliary devices are required to be purchased and installed separately, and a technology that considers pregnant women in terms of vehicle control, such as a driving mode, is insufficient.

The information included in this background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle providing various functions for a pregnant woman and a method of controlling the same.

Technical objectives to be achieved in an exemplary embodiment of the present disclosure are not limited to the above-mentioned technical objectives, and other technical objectives not mentioned will be clearly understood by those skilled in the art from the description below.

To achieve the objectives of the present disclosure, there is provided a method of supporting vehicle driving for a pregnant woman according to an exemplary embodiment of the present disclosure, the method including: determining whether to enter a driving support control for the pregnant woman based on at least one of an entry command and an input biometric information of a driver who is the pregnant woman; determining a control function to be activated among predetermined control functions in the driving support control for the pregnant woman based on at least one of the entry command and the biometric information when entering the driving support control for the pregnant woman; and performing the determined control function.

For example, the determining of the control function may include determining control parameters based on at least one of the entry command and the biometric information, and the performing of the determined control function may be performed based on the determined control parameters.

For example, the biometric information may include at least one of a date of conception, a number of days elapsed from the date of conception, an expected date of delivery, a gestational age, and a trimester of pregnancy or estimation-based information thereof.

For example, the method may further include: changing at least one of the control function and the control parameters based on whether the biometric information is changed.

For example, the determining of the control function may determine entry into the driving support control for a pregnant woman according to the entry command of a driver, and may further include determining the control function and the control parameters according to a default setting when the biometric information does not exist.

For example, the method may further include correcting the control parameters according to the default setting based on change in a situation during vehicle driving.

For example, the default setting may be performed based on a preset period during an entire pregnancy period.

For example, the determining of whether to enter the driving support control may include determining whether a pregnant woman is boarded based on at least one of a user profile in which a pregnant woman item is capable of being preset and an occupant posture information.

For example, the method may further include: waiting for a confirmation input on whether a pregnant woman is boarded when it is determined that the pregnant woman is boarded; and determining whether to enter the driving support control for a pregnant woman based on the confirmation input.

For example, the determining of the control function may include presetting at least one of a functional priority of the control function, a correction sensitivity to control correction frequency or correction width for each of the control parameters, and a computational sensitivity to assign a weight to each of the control parameters according to the biometric information.

For example, the determining of the control function may include determining a set of settings corresponding to the biometric information among a plurality of preset sets of settings, wherein each of the sets of settings may be preset to be different from each other in at least one of the functional priority, the correction sensitivity, and the computational sensitivity.

For example, the determining of the control function may include determining levels of the control parameters based on at least one of whether an event has occurred for each of the control parameters, a number of event occurrences, a sensor value, a device state value, and a reference value for each parameter.

Furthermore, a vehicle according to an exemplary embodiment of the present disclosure includes: an input device configured to receive a command from a user; and a controller communicatively connected to the input device and configured to determine whether to enter the driving support control for a pregnant woman based on at least one of the entry command and the biometric information input through the input device and to determine the control function to be activated among predetermined control functions in the driving support control for the pregnant woman based on at least one of the entry command and the biometric information when entering the driving support control for the pregnant woman to perform the determined control function.

For example, the controller may be configured to determine control parameters based on at least one of the entry command and the biometric information and may perform the determined control function based on the determined control parameters.

For example, the biometric information may include at least one of a date of conception, a number of days elapsed from the date of conception, an expected date of delivery, a gestational age, and a trimester of pregnancy or estimation-based information thereof.

For example, the controller may change at least one of the control function and the control parameters based on whether the biometric information is changed.

For example, the controller may be configured to determine entry into the driving support control for a pregnant woman according to the entry command of a driver, and may be configured to determine the control function and the control parameters according to a default setting when the biometric information does not exist.

For example, the controller may correct the control parameters according to the default setting based on change in a situation during vehicle driving.

For example, the default setting may be performed based on a preset period during an entire pregnancy period.

According to various embodiments of the present disclosure as described above, various functions for a pregnant woman may be provided.

Various functions for a pregnant woman may be provided without installing a separate auxiliary device.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 illustrates an example of control setting according to pregnancy progress according to the embodiment;

FIG. 20 is a diagram illustrating a form of control for relieving abdominal pressure due to acceleration according to the embodiment;

Figure 1:
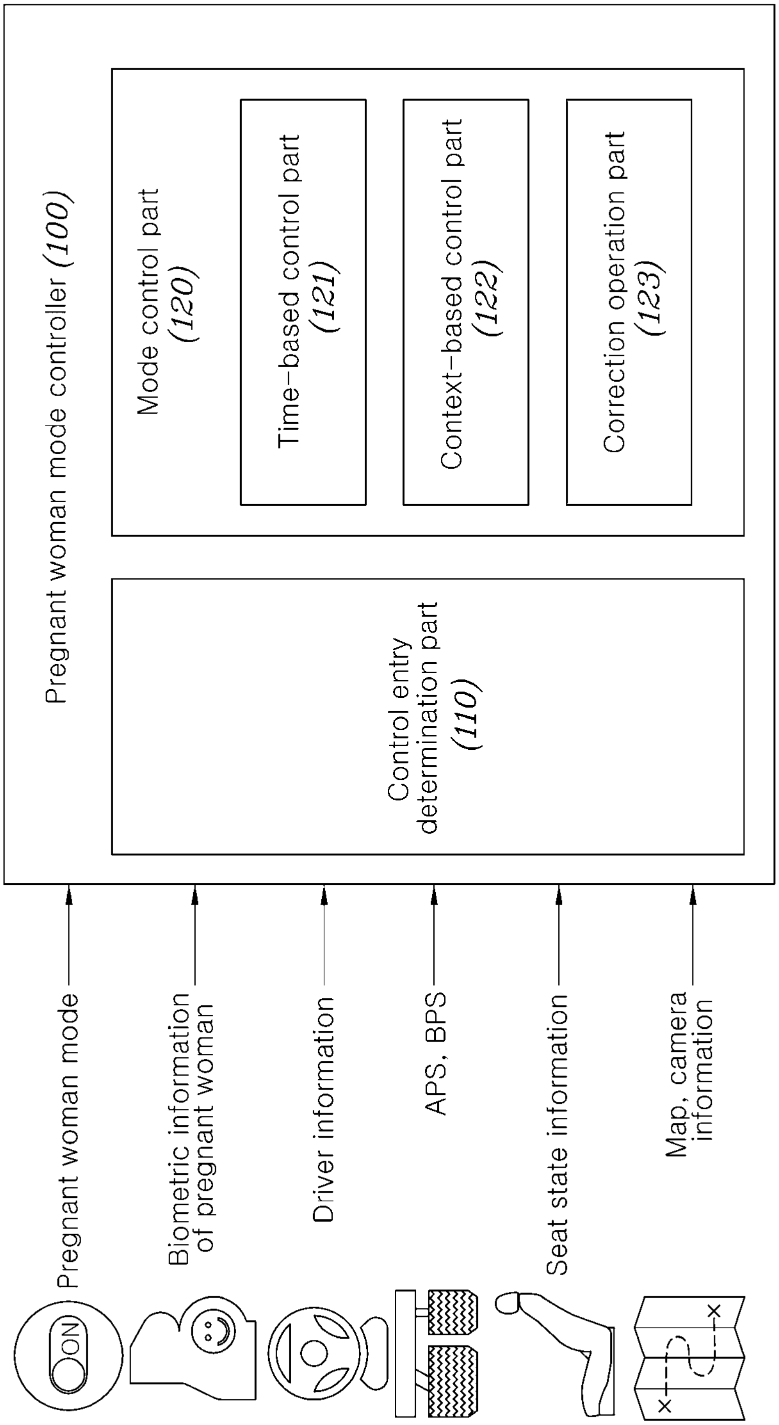
FIG. 1 illustrates an example of the configuration of a pregnant woman mode controller according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, various embodiments of the present disclosure will be described in detail with reference to the accompanying drawings and the same or similar components are provided the same reference numerals regardless of the numbers of figures and are not repeatedly described. Terms "module" and "unit" that are used for components in the following description are used only for the convenience of description without including discriminate meanings or functions. Furthermore, in the following description, if it is decided that the detailed description of known technologies related to the present disclosure makes the subject matter of the exemplary embodiments described herein unclear, the detailed description is omitted. Furthermore, the accompanying drawings are provided only for easy understanding of embodiments included in the specification, and the technical spirit included in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be directly connected to or directly coupled to another element or be connected to or coupled to another element, including the other element intervening therebetween. On the other hand, it should be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprise" or "have" used in the present specification, specify the presence of stated features, steps, operations, components, parts, or a combination thereof, but do not preclude the presence or addition of one or more other features, numerals, steps, operations, components, parts, or a combination thereof.

Furthermore, a unit or control unit included in terms such as a motor control unit (MCU) and a hybrid control unit (HCU) is just a term widely used for naming a controller that is configured to control a specific function of a vehicle, but does not mean a generic function unit. For example, each controller may include a communication device that communicates with another controller or a sensor to control corresponding functions, a memory that stores an operating system or logic commands and input/output information, and one or more processors that perform determination, calculation, decision, etc. for controlling the corresponding functions.

According to an exemplary embodiment of the present disclosure, a driving support control for a pregnant woman may be performed in a vehicle to provide various functions for assisting a pregnant woman's safe and convenient vehicle driving.

Furthermore, according to the exemplary embodiment of the present disclosure, that the driving support control for a pregnant woman is performed may mean entering a specific mode or activating the corresponding mode. A mode in which the driving support control for a pregnant woman is performed will be referred to as "a pregnant woman mode" for convenience. However, according to another exemplary embodiment of the present disclosure, at least one function for a pregnant woman may be provided for each individual function regardless of activation or entry of a specific mode.

Furthermore, a vehicle according to various exemplary embodiments of the present disclosure may have the pregnant woman mode controlled via a specific controller that is configured to control the pregnant woman mode. Here, the controlling of the pregnant woman mode means the performance of at least one of whether to enter or activate the pregnant woman mode, a function controlled through the pregnant woman mode, the judgment, determination, and operation of a control level or parameter for each function by a specific controller, and the transmittance of control signals to other related controllers.

According to the another exemplary embodiment of the present disclosure, control may be performed through different controllers for different functions, or through coordinated control of two or more different controllers.

The pregnant woman mode may be activated according to a user's command input for activating the pregnant woman mode or when a vehicle detects or estimates that a pregnant woman is boarding. This is because, when functions according to the pregnant woman mode are provided even though a pregnant woman is not on board, non-pregnant drivers or passengers may feel more alien or uncomfortable compared to a general case in which the pregnant woman mode is not provided.

Meanwhile, various functions according to the exemplary embodiment of the present disclosure may refer to control functions configured for directly and indirectly preventing or reducing stimulation which may occur while riding in a vehicle in consideration of physical and mental changes according to the progress of pregnancy of a pregnant woman, and are not limited in types, names or forms of provision. The stimulation which may occur while boarding a vehicle include i) discomfort due to seat position and seat belt wearing while riding in a vehicle, ii) difficulty in manipulation of a pedal or steering wheel in a situation in which there is such discomfort, iii) vibration and compression due to lateral and longitudinal acceleration due to vehicle behavior, slope, and road surface environment (e.g., speed bumps, etc.) iv) surprise due to changes in an external environment (e.g., movement of other vehicles, etc.), v) accumulation of fatigue according to a driving environment or a period of riding time, and vi) noise (e.g., internal media sounds, warning sounds, and horns of other vehicles, etc.), etc., but these are illustrative and not limiting.

Furthermore, a vehicle according to various exemplary embodiments of the present disclosure may consider the biometric information of a pregnant woman in providing various functions through the pregnant woman mode. The physical condition of a pregnant woman is closely related to the condition of her fetus, and in turn, the condition of the fetus is related to its growth over time. Accordingly, it is common that the physical condition of a pregnant woman changes over time. Accordingly, the biometric information of a pregnant woman may include time related to pregnancy. Here, the time related to pregnancy may include at least one of the (estimated) date of conception, the number of days elapsed from the date of conception, the expected date of delivery, a gestational age, and the trimester of pregnancy (e.g., first, second, and third trimesters) or time information which may be a basis for estimating the trimesters.

However, time related to pregnancy is illustrative and not necessarily limited thereto, and is not limited to any name, unit, and calculation standard, etc., as long as a pregnant woman's body condition such as the growth of the fetus over time may be estimated. When the control of the pregnant woman mode is performed based on the biometric information of a pregnant woman, that is, time related to pregnancy, the control may be referred to as biometric or time-based control.

Meanwhile, time related to pregnancy may be directly applied to the control of the pregnant woman mode, or may be subjected to predetermined processing, conversion, or classification. For example, days elapsed from the date of conception may be converted into weeks or classified as early/middle/late pregnancy. Furthermore, time related to pregnancy may be corrected according to the flow of actual time based on initially input information, and an intermediate change by the user is also possible. For example, when the third week is input as pregnancy-related time information for the first time in the third week of pregnancy and 4 weeks have elapsed, the pregnant woman mode may be provided based on parameters corresponding to the seventh week. For another example, when the expected date of birth is changed compared to an initially input due date and a user corrects the date, functions according to the pregnant woman mode may be provided based on the corrected due date.

When biometric information, i.e., information related to time related to pregnancy, is not input to a vehicle, in the pregnant woman mode, related functions may be controlled by detecting the change of a situation during vehicle driving based on default biometric information or a preset time or period (e.g., a second trimester) of an entire pregnancy period. Such control may be referred to as a context-based control.

Meanwhile, the inputting of the biometric information to a vehicle may mean that a vehicle occupant directly enters information related to time related to pregnancy through the manipulation of a predetermined input means or input device (e.g., a touch screen, a key button, and a dial, etc.) provided in the vehicle, but is not necessarily limited thereto, and may be input through a variety of methods. For example, the biometric information may be obtained from an external server such as a connected vehicle service server, or may be obtained through a smart device connected through short-range communication such as Bluetooth, Wi-Fi direct, or NFC. For another example, the biometric information may be determined through sensors in a vehicle or state values stored in the vehicle, such as an in-cabin camera, a weight sensor disposed on a seat, and a seat position state.

Functions provided through the pregnant woman mode may include an air conditioning control function, a route setting and time correction function, a sound limitation function, a deceleration/vehicle speed limit function, a pedal correction function, a steering wheel manipulation correction/limit function, and a driving assistance function according to driving environment information, but are illustrative and are not necessarily limited thereto. The types of detailed functions and the type of an operation for each of the functions will be described later in detail.

Hereinafter, the pregnant woman mode according to various exemplary embodiments will be described with reference to the accompanying drawings.

FIG. 1 illustrates an example of the configuration of a pregnant woman mode controller according to the embodiment.

Referring to FIG. 1, the pregnant woman mode controller 100 may include a command for a pregnant woman mode entry (or activation), the biometric information of a pregnant woman, driver information, pedal manipulation amount information (APS: an accelerator pedal position sensor, and BPS: a brake pedal position sensor), occupant posture information (that is, seat state information), and map and camera information, etc. As input information. Such input information is illustrative and is not necessarily limited thereto. For example, the input information may further include a microphone signal for detecting noise introduced from the outside thereof, and various types of sensor information (e.g., Radio detection and ranging (RADAR), LiDAR, an ultrasonic sensor, a vision sensor, a vehicle speed sensor, etc.) for detecting a driving environment.

As described above, the biometric information of a pregnant woman may mean time information related to pregnancy. Furthermore, the driver information may correspond to driver profile information selected through an AVNT (audio/video/navigation/telematics) terminal, and may be information associated with a mobile terminal connected through Bluetooth. Alternatively, the driver information may be obtained based on biometric information such as an in-cabin camera or fingerprint recognition according to the configuration of a vehicle. Furthermore, the seat state information may include information such as the longitudinal position of a seat on a seat rail and the recline angle of a seatback, but is not necessarily limited thereto. For example, the seat state information may be replaced with the occupant posture information, and the occupant posture information may further include seat belt information (withdrawal length, etc.) in addition to the seat state information.

Meanwhile, the pregnant woman mode controller 100 may include a control entry determination portion 110 and a mode control portion 120. The control entry determination portion 110 may be configured to determine whether to activate the pregnant woman mode when the boarding of a pregnant woman is detected or estimated or according to a user's pregnant woman mode entry command. Furthermore, the mode control portion 120 may perform control related to the pregnant woman mode when the control entry determination portion 110 determines to enter the pregnant woman mode. To the present end, the mode control portion 120 may include a time-based control portion 121, a context-based control portion 122, and a correction operation portion 123.

The time-based control portion 121 may be configured to determine the types of functions and a level for each function provided in the pregnant woman mode and when a pregnant woman's biometric (time) information exists, and the context-based control portion 122 may be configured to determine the types of functions and a level for each function provided in the pregnant woman mode when the biometric (time) information does not exist. Furthermore, the correction operation portion 123 may correct control parameters determined according to time information in the case of the time-based control and default control parameters for the context-based control in the case of the context-based control according to circumstances. Detailed operation of each of the components 121, 122, and 123 of the mode control portion 120 will be described later.

According to an exemplary embodiment of the present disclosure, each of the components 121, 122, and 123 of the mode control portion 120 may be a single processor (e.g., computer, microprocessor, CPU, ASIC, circuitry, logic circuits, etc.). Each of the components 121, 122, and 123 of the mode control portion 120 may be implemented by a non-transitory memory storing, e.g., a program(s), software instructions reproducing algorithms, etc, which, when executed, controls operations of various components of the vehicle, and the processor or the plurality of processors configured to execute the program(s), software instructions reproducing algorithms, etc. Alternatively, the components 121, 122, and 123 may be integrated in a single processor.

In various exemplary embodiments of the present disclosure, the mode control portion 120 may be implemented in a form of hardware or software, or may be implemented in a combination of hardware and software.

Figure 2:
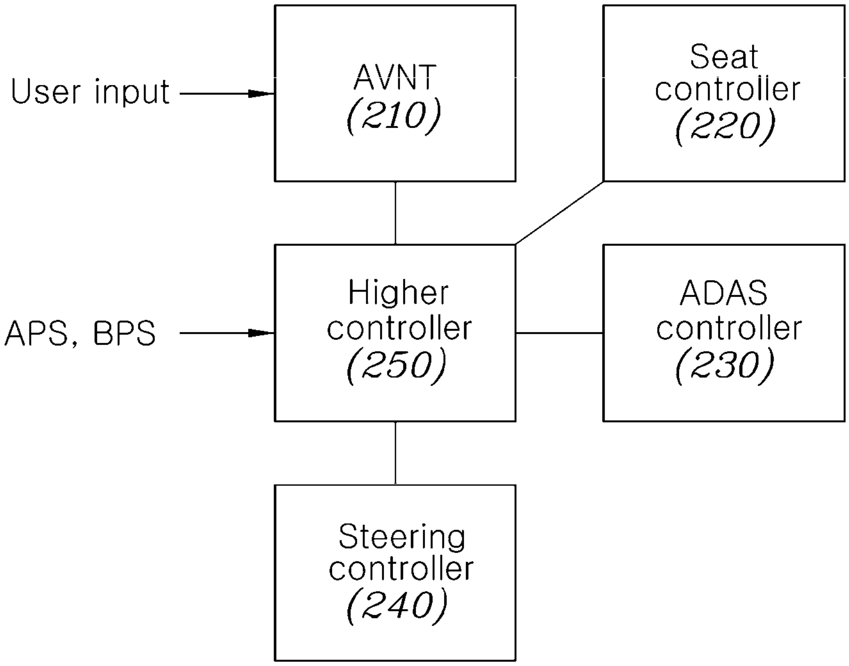
FIG. 2 illustrates an example of a control system diagram of a vehicle according to the embodiment.

FIG. 2 illustrates an example of a control system diagram of a vehicle according to the embodiment.

Referring to FIG. 2, a vehicle according to the exemplary embodiment of the present disclosure may include an AVNT terminal 210, a seat controller 220, an advanced driver assistance system (ADAS) controller 230, a steering controller 240, and a higher controller 250. Here, the higher controller 250 may correspond to the pregnant woman mode controller 100 described above with reference to FIG. 1.

According to an exemplary embodiment of the present disclosure, the seat controller 220, the advanced driver assistance system (ADAS) controller 230, the steering controller 240, and the higher controller 250 each may be a processor (e.g., computer, microprocessor, CPU, ASIC, circuitry, logic circuits, etc.). Each of the controllers 220, 230, 240 and 250 may be implemented by a non-transitory memory storing, e.g., a program(s), software instructions reproducing algorithms, etc, which, when executed, controls operations of various components of the vehicle, and a processor configured to execute the program(s), software instructions reproducing algorithms, etc. Alternatively, the controllers 220, 230, 240 and 250) may be integrated in a single processor.

Each component illustrated in FIG. 2 mainly shows controllers related to the exemplary embodiment, and it is obvious to those skilled in the art that more or less controllers may be included in the components of an actual vehicle. Hereinafter, each component will be described.

The AVNT terminal 210 may receive infotainment functions such as information output and multimedia playback, as well as commands for controlling various functions of a vehicle or information for reference in the controlling, and may provide a user interface for the present purpose. For example, in relation to the exemplary embodiment of the present disclosure, the AVNT terminal 210 may perform a function of receiving a command for the pregnant woman mode entry, a function of storing and setting a profile related to a pregnant woman, a function of receiving time information related to pregnancy, a function of setting a route and correcting time, a sound limitation function, and a function of detecting a bump on a forward route for limiting the speed of a vehicle entering a bump, and may provide a setting menu for setting other functions in a predetermined form.

In relation to the exemplary embodiment, the seat controller 220 may manage information on a seat position (e.g., an angle of a seat back and a position thereof on the seat rail, etc.) and may be configured for controlling the driving direction of a ventilation fan of a seat. According to the implementation of the seat controller 220, the seat controller 220 may be implemented as a body control module (BCM), and in the instant case, the body control module (BCM) may also perform the control of opening a window.

The ADAS controller 230 may be involved in limiting vehicle speed or acceleration according to the driving condition of a vehicle and may also determine whether or not an emergency situation exists based on information collected through various sensors (a ultrasonic sensor, radar, a camera, and LIDAR, etc.).

The steering controller 240 may perform steering angle limitation or steering angle control relative to an input steering angle in relation to an emergency steering limit function and a steering correction function.

The higher controller 250 functions as a higher controller for at least some of the remaining controllers described above, and may perform the overall control of a powertrain during vehicle driving. Furthermore, in relation to the exemplary embodiment of the present disclosure, APS/BPS correction such as applying scaling to the value of a manipulation amount detected by an accelerator pedal position sensor (APS) or the value of a manipulation amount detected by a brake pedal position sensor (BPS) is performed, and based on the correction, a base torque, a required torque for a driving source, or a required braking force for a braking source may be determined.

In implementation, the higher controller 250 may be implemented as a vehicle integrated controller (VCU) in the case of an electric vehicle or as a hybrid controller (HCU) in the case of a hybrid vehicle, but is illustrative and not necessarily limited thereto.

Figure 3:
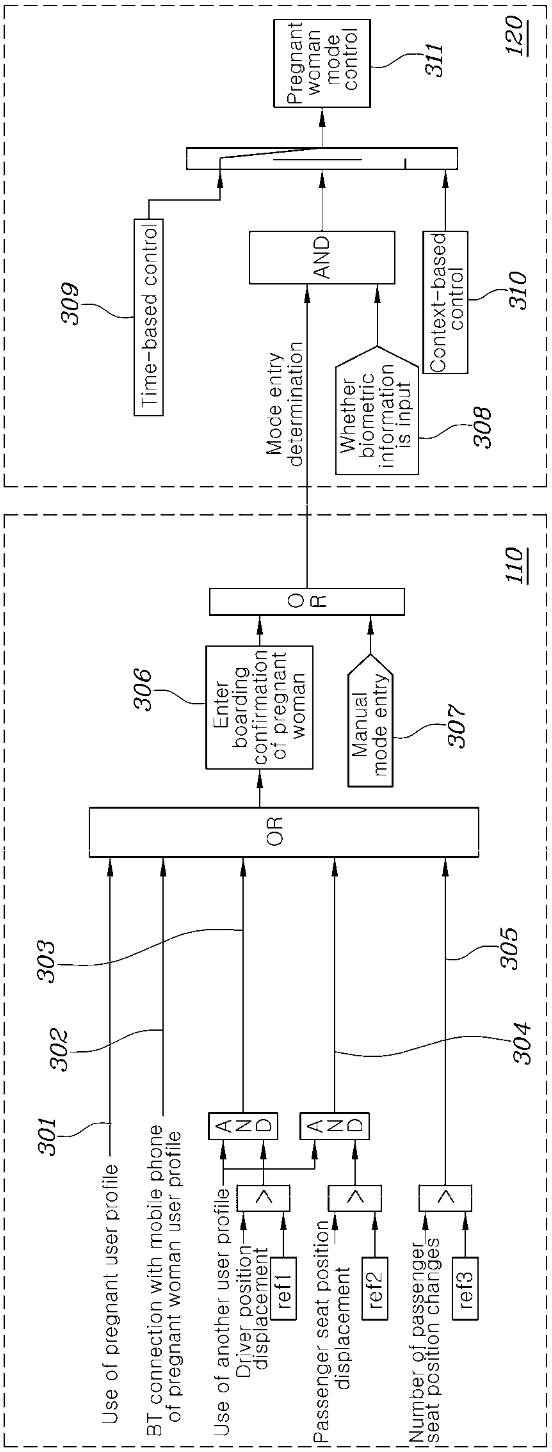
FIG. 3 is a diagram illustrating the operation of the pregnant woman mode controller according to the embodiment.

FIG. 3 is a diagram illustrating the operation of the pregnant woman mode controller according to the embodiment.

Referring to FIG. 3, the control entry determination portion 110 of the pregnant woman mode controller 100 may be configured to determine to enter the pregnant woman mode in a case 306 in which a pregnant woman's boarding is determined or in a case 307 in which an occupant manually inputs a command for the pregnant woman mode entry.

In a case 301 in which a user profile in which a pregnant woman item is preset is selected in the AVNT 210, in a case 302 in which a user profile in which the pregnant woman item is preset is not selected in the AVNT 210 but Bluetooth pairing (or search with a connectable device) is made with a mobile phone linked to the associated profile, in a case 303 in which another user profile (that is, a profile in which the pregnant woman item is not preset) is selected in the AVNT 210 but a driver's seat position displacement is greater than a predetermined value ref1, in a case 304 in which a passenger seat position displacement is greater than a predetermined value ref2, or in a case 305 in which the number of passenger seat position changes is greater than a predetermined value ref3, the control entry determination portion 110 waits for confirmation of boarding of a pregnant woman, and waiting for the confirmation of boarding may be performed in a form of guidance information output 306. Here, the guidance information output 306 may be performed in a form of outputting a pop-up message to an output device such as the AVNT 210 or cluster and receiving a confirmation input from a user, but is not necessarily limited thereto. For example, the guidance information output may be performed in a form of simply notifying the pregnant woman mode entry without a confirmation input. Here, checking the position displacement of each seat or checking the number of position changes is based on the fact that it is common for a pregnant woman to secure a large space by moving a seat backwards.

A manual mode entry 307 may mean that an occupant inputs intention to enter the pregnant woman mode to a vehicle by manipulating a button including a corresponding function or a preset specific button through a function selection menu provided through the AVNT 210 or a predetermined user setting menu (USM), but is not necessarily limited thereto.

When the control entry determination portion 110 determines the pregnant woman mode entry and notifies the mode control portion 120 of the pregnant woman mode entry, the mode control portion 120 is configured to determine whether to perform the time-based control 309 or the context-based control 310 depending on whether the input 308 of biometric (time) information has been performed, and a pregnant mode control 311 may be performed according to the determined control method. That is, when there is biometric (time) information, the time-based control portion 121 may perform the time-based control 309, but when there is no biometric (time) information, the context-based control portion 122 may perform the context-based control 310.

Figure 4:
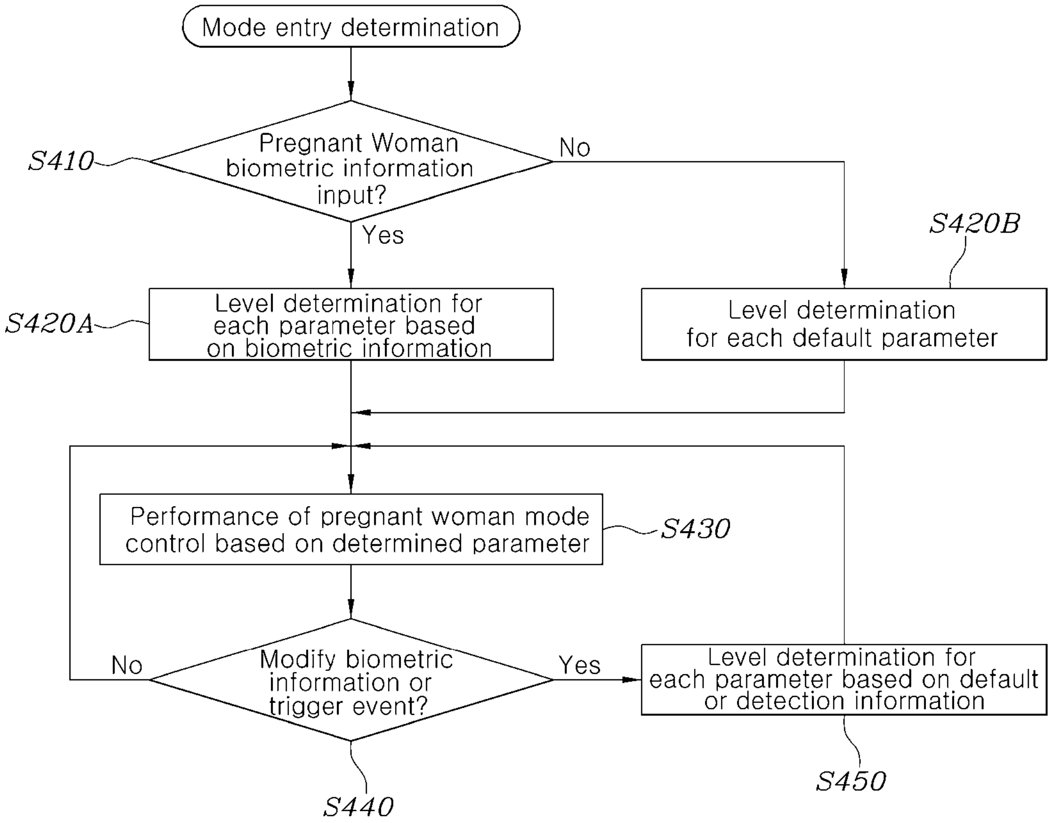
FIG. 4 is a flowchart illustrating the operation of a mode control portion according to the embodiment.

FIG. 4 is a flowchart illustrating the operation of the mode control portion according to the embodiment.

Referring to FIG. 4, when the pregnant woman mode entry is determined in the control entry determination portion 110, the mode control portion 120 may be configured to determine whether the biometric information of a pregnant woman is input at S410.

When the biometric information of a pregnant woman is input (Yes at S410), the time-based control portion 121 may be configured to determine a level for each parameter based on the biometric information at S420A. In contrast, when the biometric information is not input (No at S410), the context-based control portion 122 may be configured to determine a default parameter level at S420B.

For example, the time-based control portion 121 may be configured to determine a pregnancy status as a first trimester (1 to 14 weeks), a second trimester (15 to 28 weeks), or a third trimester (29 to 42 weeks) based on the biometric information, and may set level 3 for each parameter in the first trimester, level 1 for each parameter in the second trimester, and level 2 for each parameter in the third trimester. Furthermore, the context-based control portion 122 may set level 1 for each parameter by assuming the second trimester as a default level. Here, a higher level may mean that control is performed in a direction in which pressure applied to a pregnant woman is further reduced.

Furthermore, each parameter may mean a control level for each function or a base situation level for determining a control level for each function. For example, when a parameter is an acceleration limit level, a deceleration limit level, or a distance level, the parameter may mean a control level for each function, and when a parameter is a warning level, a danger level, or a surprise level, the parameter may mean a base situation level.

However, the types of parameters, level division step, and control direction according to level increase, etc. described above are examples and are not necessarily limited thereto.

Meanwhile, when a parameter is determined, the mode control portion 120 may perform a pregnant woman mode control based on the determined parameter at S430, and when the biometric information is modified or an event occurs during the performing of the pregnant woman mode control (Yes at S440), the correction operation portion 123 may correct at least some parameters based on the modified information or the event at S450.

In the above description, it is assumed that levels of overall parameters are assigned to be equal according to a pregnancy status in the time-based control, but a different level may be assigned to each parameter. This will be described with reference to FIG. 5.

FIG. 5 illustrates an example of control setting according to pregnancy progress according to the embodiment Referring to FIG. 5, an example is illustrated in a form of a plurality of sets of settings with predetermined values of parameters corresponding to the kind of a function controlled primarily, a correction sensitivity, and a computational sensitivity within the pregnant woman mode, for each of the first, second, and third trimesters. Even in the instant case, as described above, a setting for the second trimester may be applied as the default parameter level in the context-based control.

In FIG. 5, the correction sensitivity may mean a numerical value and a level for correcting APS according to a driver's driving manipulation or body shape during the pregnant woman mode. That is, as the level of a parameter belonging to the correction sensitivity is lower, the frequency of determining correction may decrease, and the range of the correction may also increase. On the other hand, as the level of the parameter belonging to the correction sensitivity is higher, correction may be performed relatively frequently, and the range of the correction may be relatively low during one-time correction.

Furthermore, the computational sensitivity may refer to weights of factors that determine parameter correction. For example, a pregnant woman in the first trimester may be sufficiently sensitive to pitching during the movement of a vehicle. Accordingly, assuming that the value of a pitching sensor is related to a surprise event parameter, the assignment of a weight of level 3 to the pitching sensor as illustrated in FIG. 5 may have a greater influence on determining the level of the surprise event parameter. Accordingly, when pitching occurs, the level of the surprise event rises rapidly, and the parameter correction may be performed so that control is performed in the direction of preventing or reducing the surprise event according to the rising of the level of the surprise event.

Figure 6A:
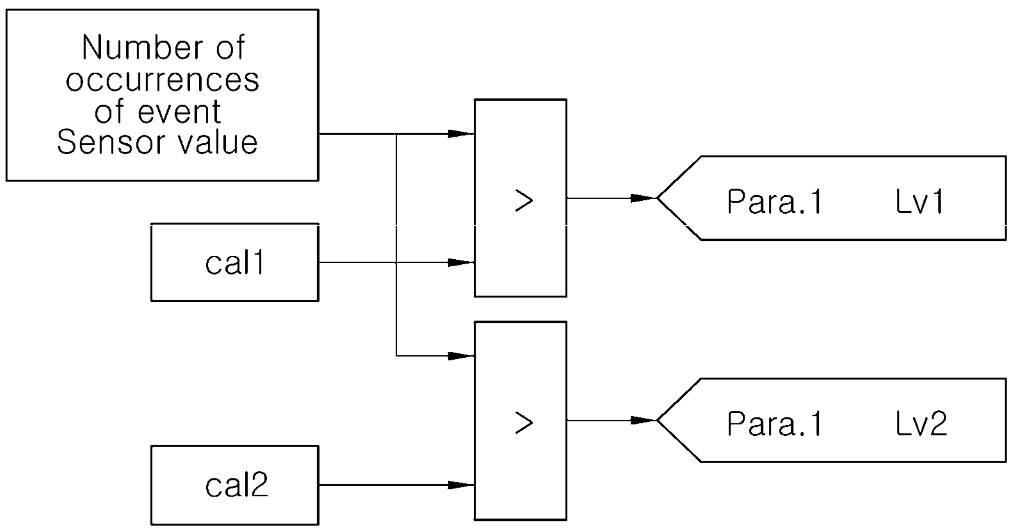
FIG. 6A, FIG. 6B, and FIG. 6C illustrate examples of forms of determination of control parameters according to the embodiment.
Figure 6B:
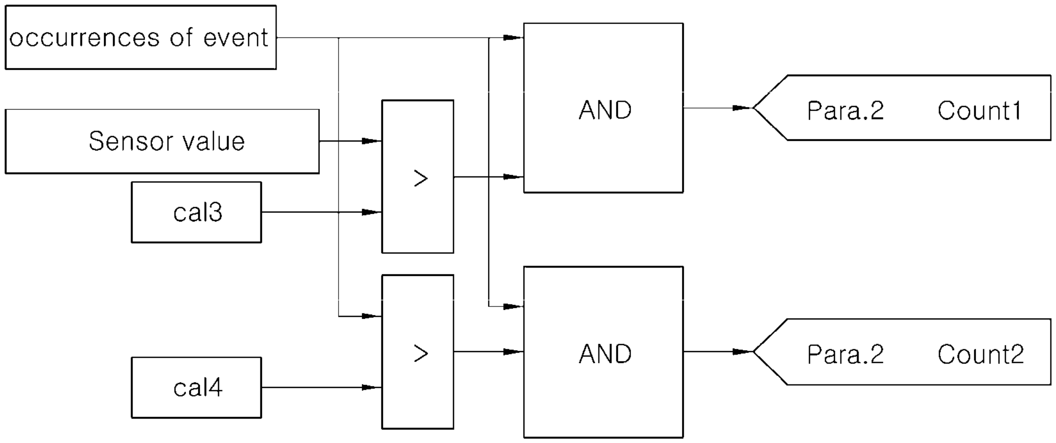
Figure 6C:
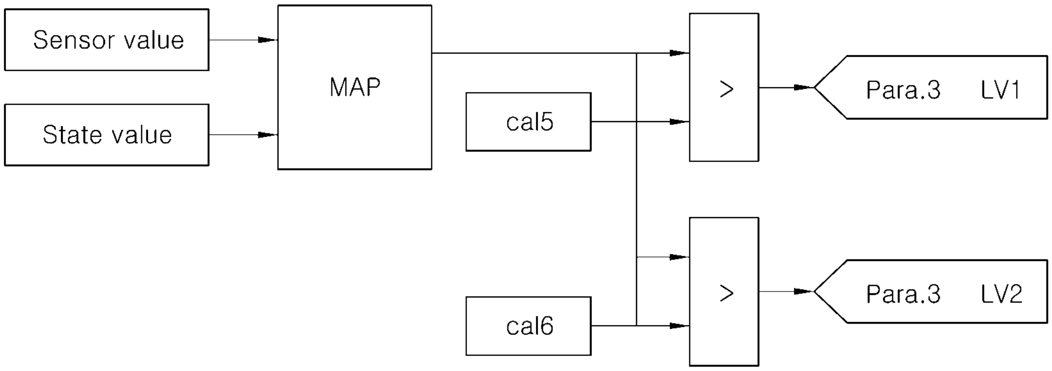

FIG. 6A, FIG. 6B, and FIG. 6C illustrate examples of forms of determination of control parameters according to the embodiment.

First, referring to FIG. 6A, the number of occurrences of an event or a sensor value may be compared with preset different reference values (cal1 and cal2), and the level of a parameter may be determined according to the result of the comparing. The number of event occurrences may be the number of collision warnings or an external horn sound detection count, etc., but is not necessarily limited thereto.

Next, referring to FIG. 6B, on the premise that a preset event occurs, a sensor value at that time is compared with different reference values cal3 and cal4, and the level of a parameter may be determined according to the result of the comparing. For example, the value of a surprise event count may be determined based on a vehicle pitching sensor value when a forward event occurs.

Furthermore, referring to FIG. 6C, a parameter level may be determined by combining current state values of different sensors or devices. For example, a steering wheel torque sensor value and a seat position value may be referred to a map, and the referred values may be compared with different reference values cal5 and cal6, and the level of a steering manipulation correction parameter may be determined according to the result of the comparing.

The parameter determination method described above with reference to FIG. 6A to 6C is illustrative, and a simpler method or a method combining various factors is of course possible.

Next, FIG. 7 and FIG. 8, the form of the determination and correction of parameters for each control method will be described with specific examples with reference to FIGS. 7 and 8.

Figure 7:
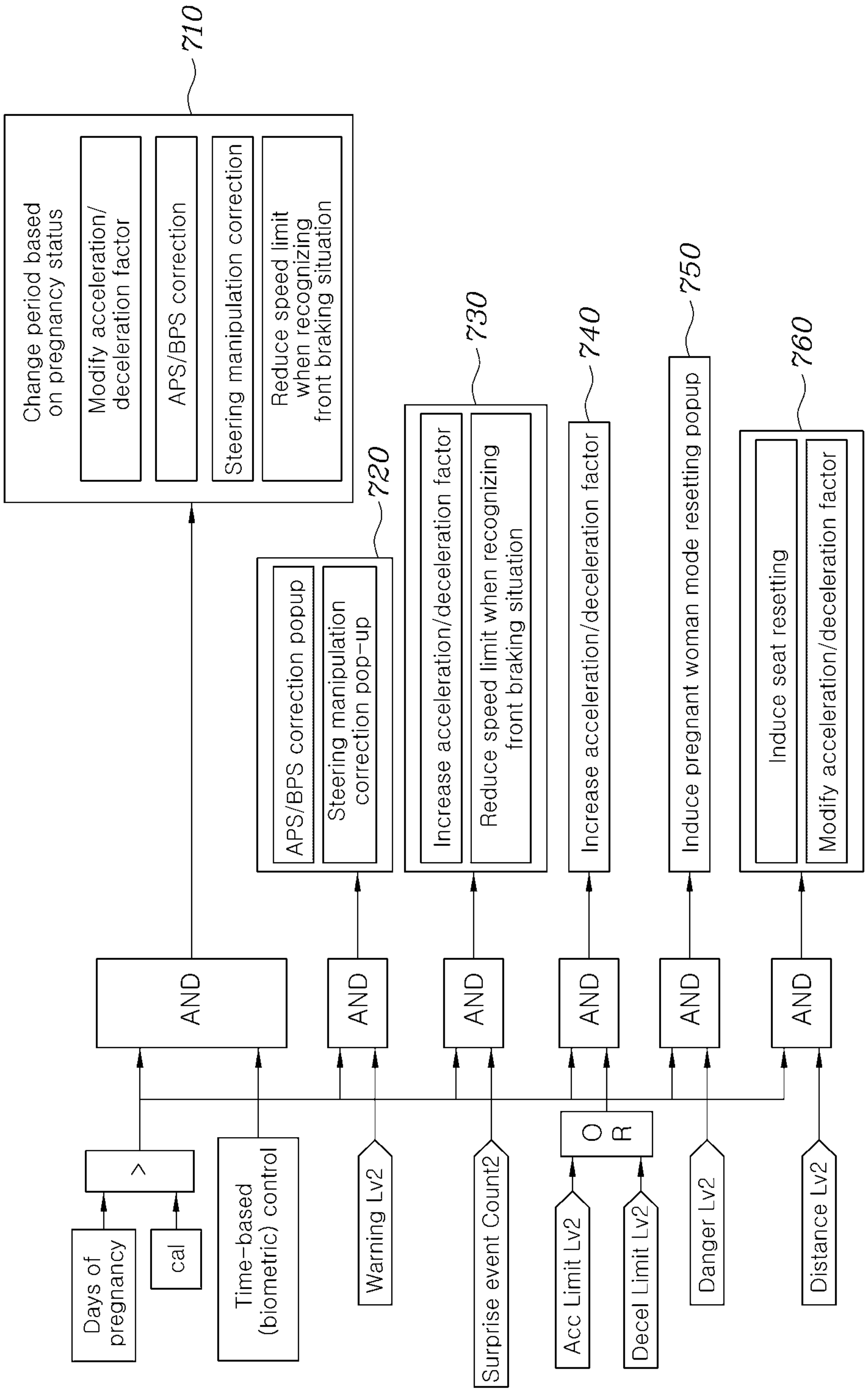
FIG. 7 illustrates an example of a form in which the determination and correction of the control parameters are performed in time-based control according to the embodiment.

FIG. 7 illustrates an example of a form in which the determination and correction of the control parameters are performed in time-based control according to the embodiment. In FIG. 7, it is assumed that time information is the elapsed days of pregnancy. However, this is an example, and the elapsed days of pregnancy may be replaced with other types of information corresponding thereto, such as the gestational age and remaining days until the due date of childbirth.

Referring to FIG. 7, as the time-based control is applied, initial parameters 710 may be preset according to the elapsed days of pregnancy. For example, the initial parameters may be parameters related to an acceleration/deceleration factor, the APS/BPS correction, the steering manipulation correction, and a limit speed setting when a front braking situation is recognized.

With the initial parameters 710 preset based on the time information, as the warning level reaches a predetermined value (here, level 2) for the elapsed days of corresponding pregnancy, the APS/BPS correction and the steering manipulation correction 720 may be additionally performed, and as the surprise event count reaches a predetermined value (here, level 2) for the elapsed days of corresponding pregnancy, acceleration/deceleration factor upward correction and speed limit reduction correction 730 may be additionally performed when a forward braking situation is recognized.

Furthermore, when acceleration limit or deceleration limit reaches a predetermined value (level 2 here), the increase 740 of the acceleration/deceleration factor may be performed, and when the danger level increases, the output 750 of pop-up information which induces the resetting of the pregnant woman mode may be performed. Furthermore, in the same manner as in FIG. 6C, when a seat distance level reaches a level (here, level 2) representing a state in which normal driving may be difficult, the resetting 760 of a seat or the correction 760 of an acceleration/deceleration factor may be performed.

Figure 8:
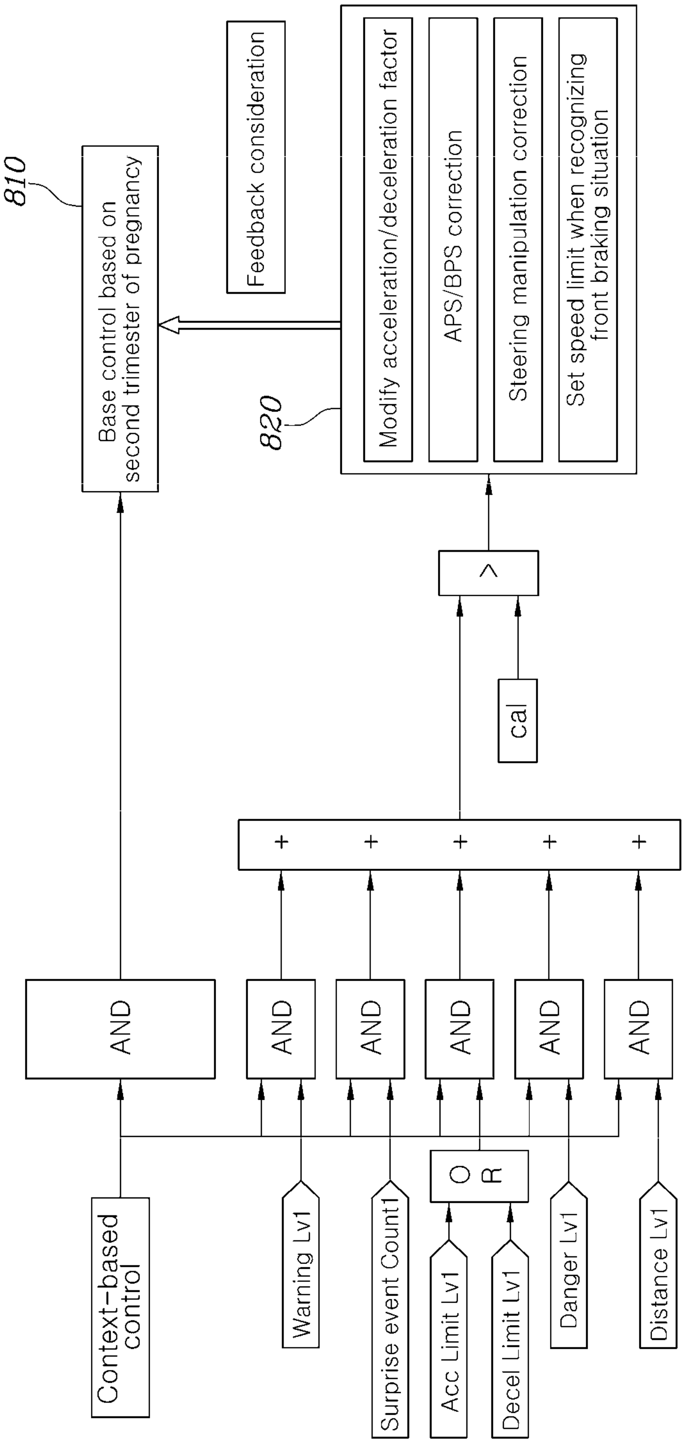
FIG. 8 illustrates an example of a form in which the determination and correction of the control parameters are performed in a context-based control according to the embodiment.

FIG. 8 illustrates an example of a form in which the determination and correction of the control parameters are performed in the context-based control according to the embodiment.

Referring to FIG. 8, as the context-based control is applied, parameters preset for the second trimester may be preset as initial parameters 810.

With the initial parameters 810 preset, a warning level, an event alarm count, an acceleration limit level, a deceleration limit level, a danger level, and a seat distance level, etc. may be compared with predetermined reference values. According to the comparison result, it is possible to correct the initially preset parameters 810 such as parameters related to acceleration/deceleration factor, APS/BPS correction, steering manipulation correction, and limit speed setting when a forward braking situation is recognized.

The direction of correction may be performed similarly to or differently from the case of FIG. 7. Accordingly, it is obvious to those skilled in the art that various modifications of the direction of correction are possible, and thus specific examples thereof will be omitted.

Hereinafter, each function which may be provided through the pregnant woman mode will be described.

Functions which may be provided through the pregnant woman mode may largely include AVNT utilization control, impact reduction assistance control, air conditioning control, and control for ensuring safety of a pregnant woman.

First, the AVNT utilization control may include a user profile management function, the function of notifying optimal route and rest through fatigue prediction, an exercise convenience function for a pregnant woman, and a sound limitation function.

The user profile management function may refer to a function of storing biometric (time) information of a pregnant woman for a user profile in which a pregnant woman item is preset and updating the biometric information according to the passage of time or an additional user input. Additionally, the function of guiding an appropriate seat position for each time by further using other body information (e.g., height and weight) may be provided.

The function of notifying optimal route and rest through fatigue prediction may refer to the function of searching a route by considering fatigue and a resting place for a pregnant woman who needs frequent rest and of inducing stopping and resting at appropriate time and place.

The exercise convenience function for a pregnant woman may refer to a function of guiding a possible exercise in a vehicle according to time information. To assist the exercise, control of the motor output of electronic steering or control of a seat position may be performed.

The sound limitation function may refer to a function of limiting multimedia output sound to reduce the pregnant woman's distraction or stress caused by sound.

Next, the impact reduction assistance control may refer to a bump entry vehicle speed limit function that activates a warning based on a situation that causes braking at a front side and prevents sudden braking. The fetus inside a pregnant woman's body is protected by amniotic fluid. The fetus is subjected to the so-called a "drag & squeeze" effect in the amniotic fluid, and due to this, when acceleration occurs, such as going on a bump, the fetus feels acceleration different from acceleration felt by its mother. The effect of amniotic fluid on the fetus may be represented by a head injury criterion (HIC) index, and an HIC for each vehicle speed is determined according to the height and width of a bump, and a vehicle limit speed before entering a bump which is not harmful to the fetus is determined. Accordingly, a vehicle speed may be limited through the associated function according to the vehicle limit speed determined in consideration of the HIC.

The air conditioning control function is for pregnant woman whose constipation and farts increase due to the effects of pregnancy (morning sickness, hormonal changes, delayed food transit time in the small intestine caused by the volume of the uterus, and muscle relaxation in the large intestine, etc.), and rotates the ventilation fan of a seat in a reverse direction compared to a normal operation direction according to the input of a specific type of command, such as a button input, to discharge air around the seat to a rear seat. In the instant case, a rear seat window may be automatically opened to ensure efficient ventilation.

The control for ensuring safety of pregnant woman may include limiting acceleration/deceleration, APS/BPS correction, limiting steering manipulation in an emergency situation, steering manipulation correction, and controlling preparation for boarding a pregnant woman, etc.

An acceleration/deceleration limiting function may refer to a function that limits acceleration or deceleration due to the high possibility of the abdomen leaning forward depending on a method in which a pregnant woman wears a belt (wearing the belt away from a belly area or wearing an assistive device to minimize abdominal pressure).

A pedal manipulation amount (APS/BPS) correction function may refer to a function of correcting a pedal manipulation amount to achieve a similar effect to an effect of a pedal extender without the pedal extender as a pedal moves away from a normal seat position in a situation in which a pregnant woman drives away from a steering wheel to reduce pressure on the abdomen and secure space for activating an airbag.

The emergency steering limit function is the function of protecting a pregnant woman in a front passenger seat by applying restriction to steering to the left when the pregnant woman is seated in the front passenger seat. This is based on the fact that a driver instinctively manipulates a steering wheel to the left to protect himself or herself in an emergency.

The function of the steering manipulation correction is intended to respond to the phenomenon that the angle of the arm that forms a steering angle is insufficient due to the characteristics of a pregnant woman who drives away from a steering wheel, and the steering angle increases as cross steering is frequently used, resulting in increased lateral acceleration. The function of the steering manipulation correction may refer to a function for providing a stable feeling of manipulation to a pregnant woman at the end of the second trimester of pregnancy by presetting limit lateral acceleration for vehicle speed to reduce the present increase in lateral acceleration and resetting the critical angle of steering manipulation based on this.

The function of controlling preparation for boarding a pregnant woman may refer to the control of securing an EV driving distance in advance, that is, the state of charge (SOC) value of a battery in preparation for a driving cycle in which a pregnant woman is expected or scheduled to board especially in an eco-friendly vehicle for the pregnant woman sensitive to odors, minimizing unpleasantness caused by exhaust gas.

Hereinafter, each function will be described in detail.

Figure 9:
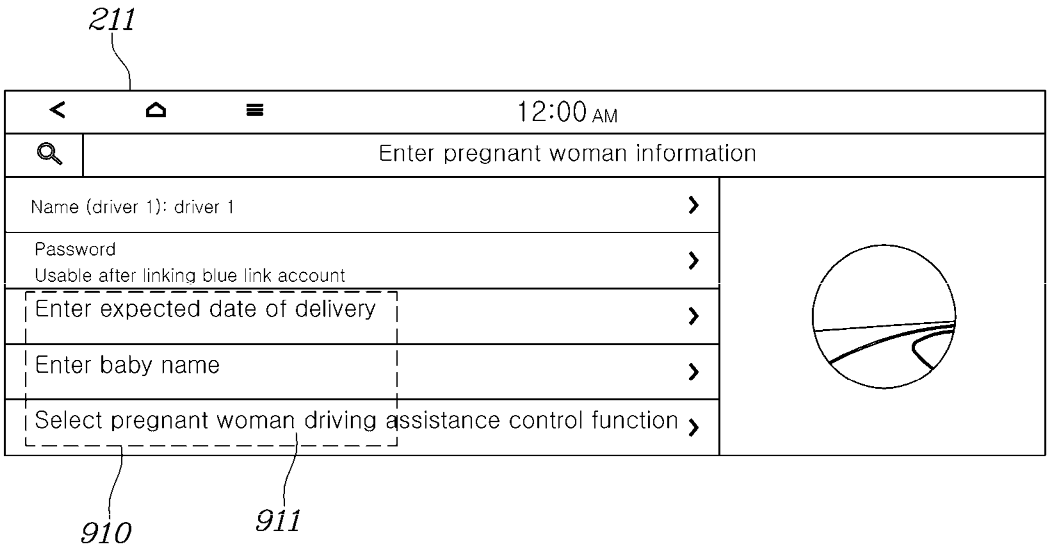
FIG. 9 illustrates an example of a setting menu for a driving assistance control function for a pregnant woman according to the embodiment.

FIG. 9 illustrates an example of a setting menu for a driving assistance control function for a pregnant woman according to the embodiment.

For convenience, in the following drawings including FIG. 9, it is assumed that various menu screens provided as a user interface are displayed through a display device 211 of the AVNT terminal 210 unless otherwise stated, such as being provided through a cluster. However, this is an example, and a device that outputs the menu screens is not necessarily limited thereto. For example, the menu screens may be displayed through the display of the cluster. Furthermore, it is obvious to those skilled in the art that specific configuration forms or items of the following menu screens are also illustrative, and may be variously modified.

Referring to FIG. 9, in relation to a user profile management function, a pregnant woman information input menu 910 may be provided through a predetermined menu manipulation. The pregnant woman information input menu 910 may include items such as an expected date of delivery, a baby's name, and a driving assistance control function selection 911 for a pregnant woman. Through the driving assistance control function selection 911 for a pregnant woman, whether to apply detailed functions and an initial level provided in the pregnant woman mode may be preset for each user profile. Depending on implementation of the pregnant woman mode, the manual activation of the pregnant woman mode may be performed through the corresponding selection 911.

Figure 10:
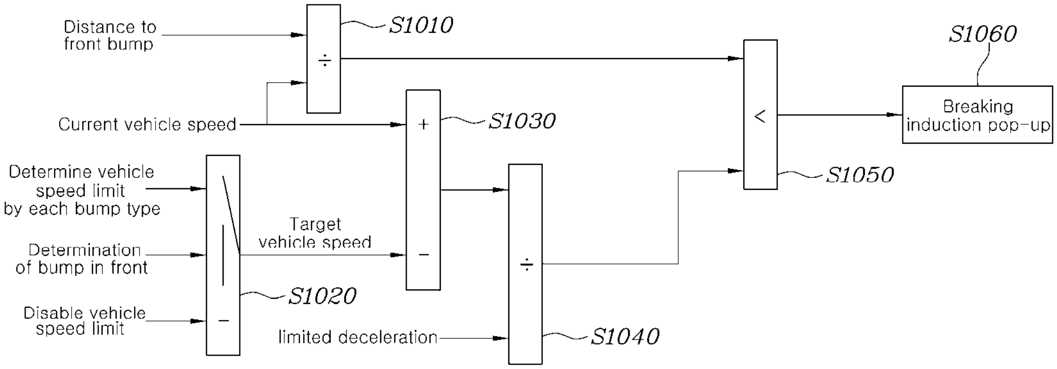
FIG. 10 illustrates an example of bump entry vehicle speed limit logic according to the embodiment.

FIG. 10 illustrates an example of bump entry vehicle speed limit logic according to an exemplary embodiment of the present disclosure.

Referring to FIG. 10, in relation to the bump entry vehicle speed limit function, bump arrival time may be obtained by dividing a distance to a bump existing on a front route by a current vehicle speed at S1010.

Furthermore, when a bump is present at a front side, based on limited vehicle speed determined by considering the type of the bump according to the size or shape of the bump (e.g., referring to a vehicle speed limit table for each bump type) and whether vehicle speed limit is disabled (i.e., when the vehicle speed limit is disabled, the logic of FIG. 10 stops), target vehicle speed may be determined at S1020. For example, assuming that the above-mentioned HIC for an infant under the age of one is allowed up to 390 and the size of a bump provided by a navigation system is 0.12 m in height and 0.5 m in width, limited vehicle speed to satisfy this may be 42 KPH. Of course, depending on an exemplary embodiment of the present disclosure, when the size of a bump may be actually measured by a camera, the limited vehicle speed may be determined based on the measured value instead of the information provided by the navigation system.

A period of deceleration time required to decelerate to the target vehicle speed may be determined by subtracting the target vehicle speed from a current vehicle speed at S1030 and dividing the obtained value by the preset limited deceleration applied to automatic deceleration control at S1040.

When the period of deceleration time is longer than bump arrival time at S1050, deceleration greater than the limited deceleration is required, so in preparation for this, a braking induction pop-up may be output through a cluster so that a pregnant woman can perform braking at S1060.

In performing the present function, the determination of limited vehicle speed or deceleration may be different for each pregnancy stage. For example, in the second trimester of pregnancy, default control may be followed, in the first trimester of pregnancy, the limited vehicle speed may be preset to satisfy the lowest HIC, and in the third trimester of pregnancy, the limited deceleration may be preset to be even lower to prevent the leaning of the abdomen.

Figure 11:
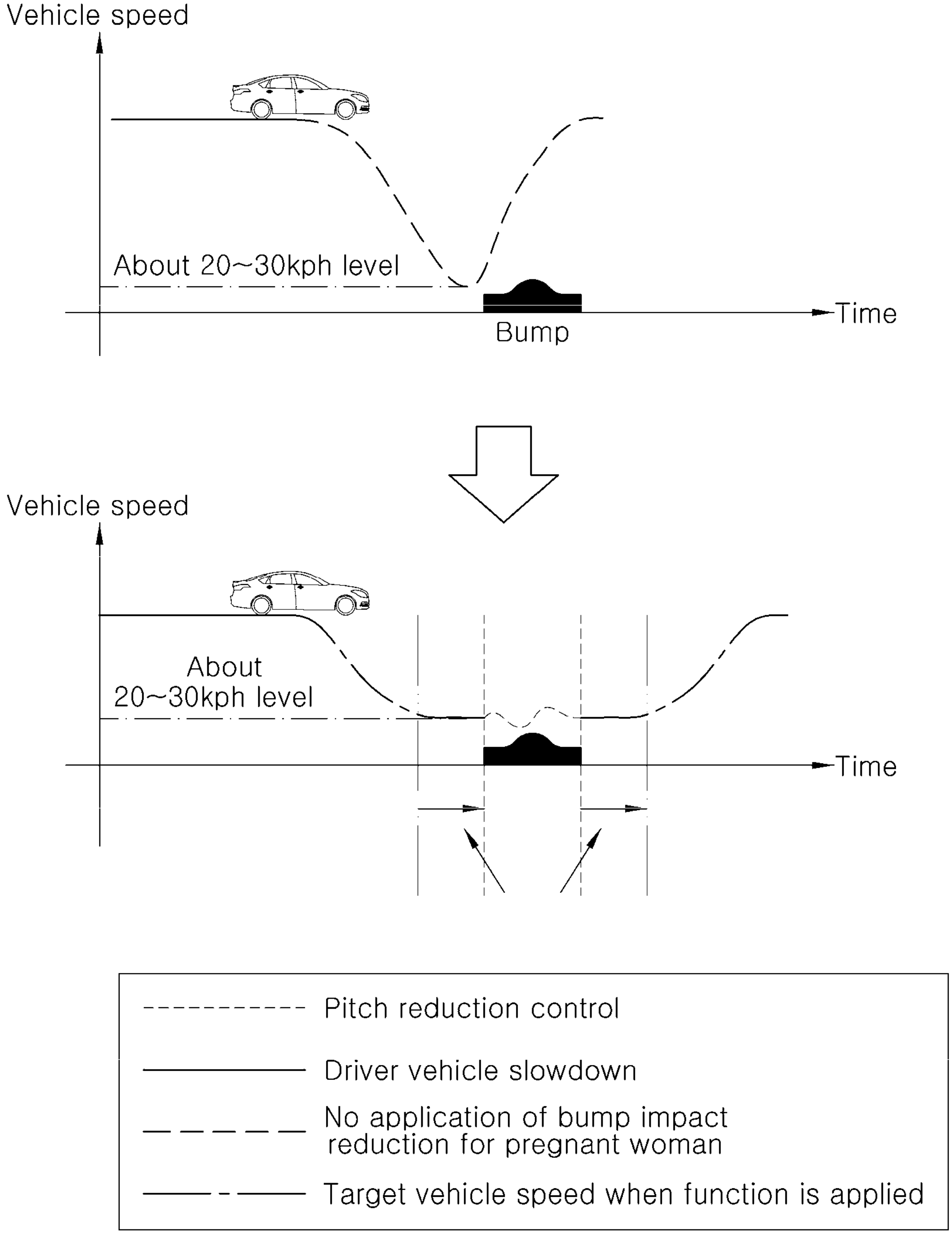
FIG. 11 is a diagram illustrating a bump entry vehicle speed limit function according to the embodiment.

FIG. 11 is a diagram illustrating the bump entry vehicle speed limit function according to the embodiment.

In a case in which the control described above with reference to FIG. 10 is not performed, as illustrated at the upper side of FIG. 11, acceleration is performed immediately after satisfying limited vehicle speed for entry (here, 20 to 30 kph), which may be insufficient to substantially reduce an impact over a bump. Unlike this, as illustrated at the lower side of FIG. 11, it is possible to satisfy limited vehicle speed before a predetermined distance before entering a bump, to drive at constant speed for predetermined distances before and after the bump, and to more actively satisfy HIC through pitching reduction control in a bump section. Here, the pitching reduction control may apply a pregnant woman correction factor according to time information.

In summary, in general control, only the satisfaction of limited vehicle speed is considered before entering a bump, but in the control according to the exemplary embodiment of the present disclosure, it is possible to minimize impact on a pregnant woman and the fetus through constant speed driving in sections before and after a bump and pitching reduction control in a bump section after decelerating in advance impact may be minimized.

Figure 12:
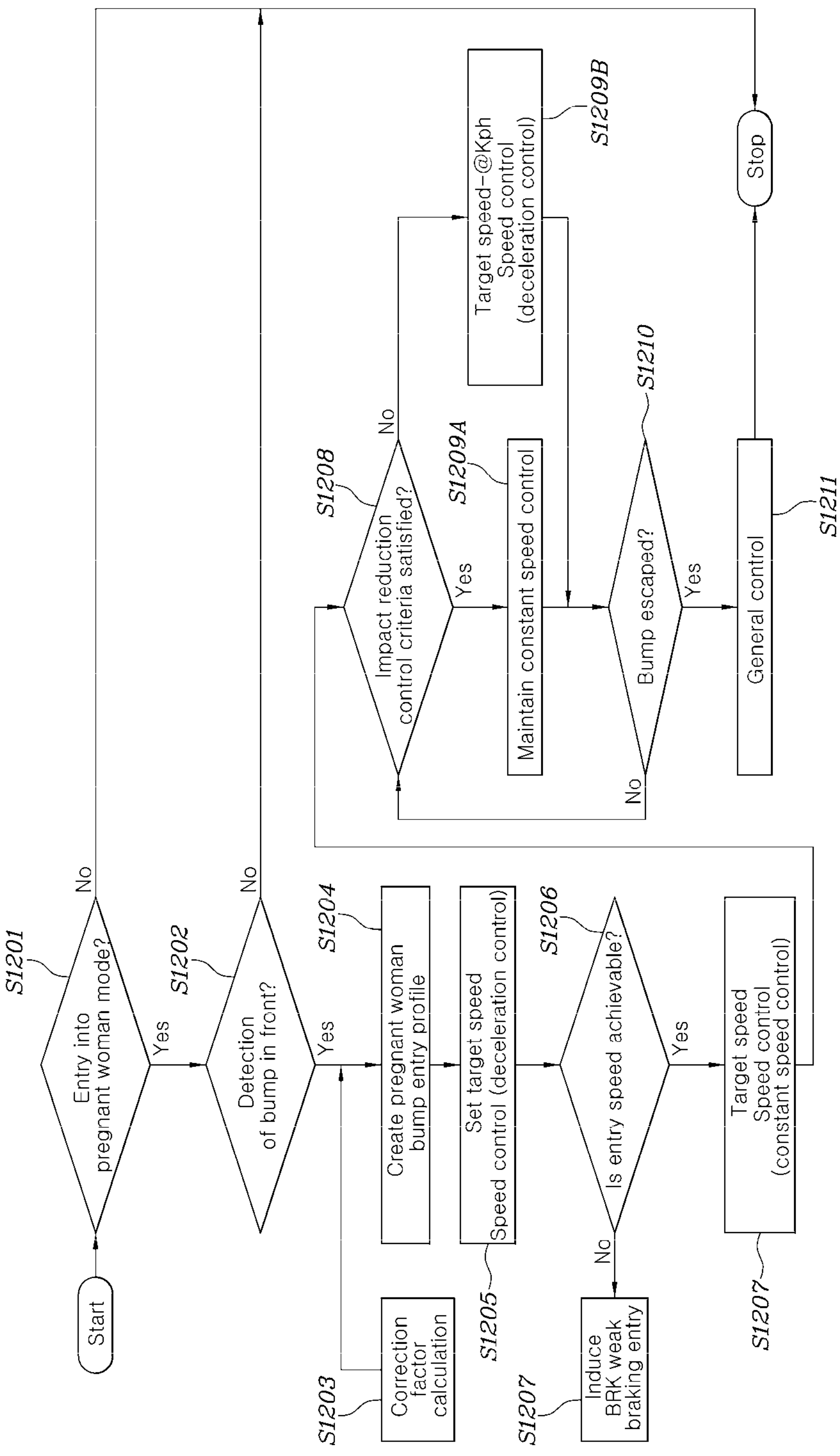
FIG. 12 is a flowchart illustrating an example of a process in which the bump entry vehicle speed limit function is performed according to the embodiment.

FIG. 12 is a flowchart illustrating an example of a process in which the bump entry vehicle speed limit function is performed according to the embodiment.

Referring to FIG. 12, when a bump is detected in a front at S1202 in a state in which the pregnant woman mode is entered (Yes at S1201), a bump entry profile for a pregnant woman may be generated at S1204 according to time information or a context-based correction factor at S1203. The bump entry profile may include information for limited vehicle speed for entry and limited deceleration considering time information or context-based parameters, and information for constant speed control in a section around a bump and pitching reduction control in a bump section.

Speed control is performed to satisfy a target speed according to the bump entry profile at S1205, and the mode control portion 120 may be configured to determine whether or not an entry speed may be reached with basic deceleration at S1206. When the entry speed cannot be satisfied (No at S1206), braking is induced at S1207, and when the entry speed may be satisfied (Yes at S1206), driving may be controlled at a constant target speed for a predetermined section before entering a bump at S1207.

Meanwhile, even at the target speed, whether or not an impact reduction control criterion is satisfied may be determined at S1208. When the impact reduction control criterion is satisfied (Yes at S1208), constant speed control may be maintained at S1209A, and when the impact reduction control criterion is not satisfied (No at S1208), additional deceleration control may be performed at S1209B. According to the exemplary embodiment of the present disclosure, pitching reduction control may be performed together with or in place of the additional deceleration control.

In case of escaping a bump section (Yes at S1210), the bump entry vehicle speed limit function is terminated, and general control applied before the bump section (e.g., general smart cruise control) may be performed at S1211.

Hereinafter, the function of notifying optimal route and rest through fatigue prediction will be described with reference to FIGS. 13 to 19.

A pregnant woman feels considerable pressure on the abdomen when wearing a seat belt. Furthermore, when there is an acceleration fluctuation that causes the body to lean forward, the pregnant woman feels even greater pressure. For example, rapid deceleration in a steel plate situation or the start of congestion and frequent acceleration and deceleration within a congestion section increase the pressure. The increased pressure causes greater fatigue, and furthermore to the acceleration fluctuation, fatigue may increase even when passing unpaved roads, sections with bumps such as speed bumps, and accident-prone areas. Contrarily, fatigue may be reduced after visiting a sleeping shelter, a rest area, a cafe, and a restroom. Considering the presence of these fatigue-inducing factors and fatigue-reducing factors, a pregnant woman may reduce fatigue by avoiding the fatigue-inducing factors and including the fatigue-reducing factors in a route. This will be described with reference to FIG. 13.

Figure 13:
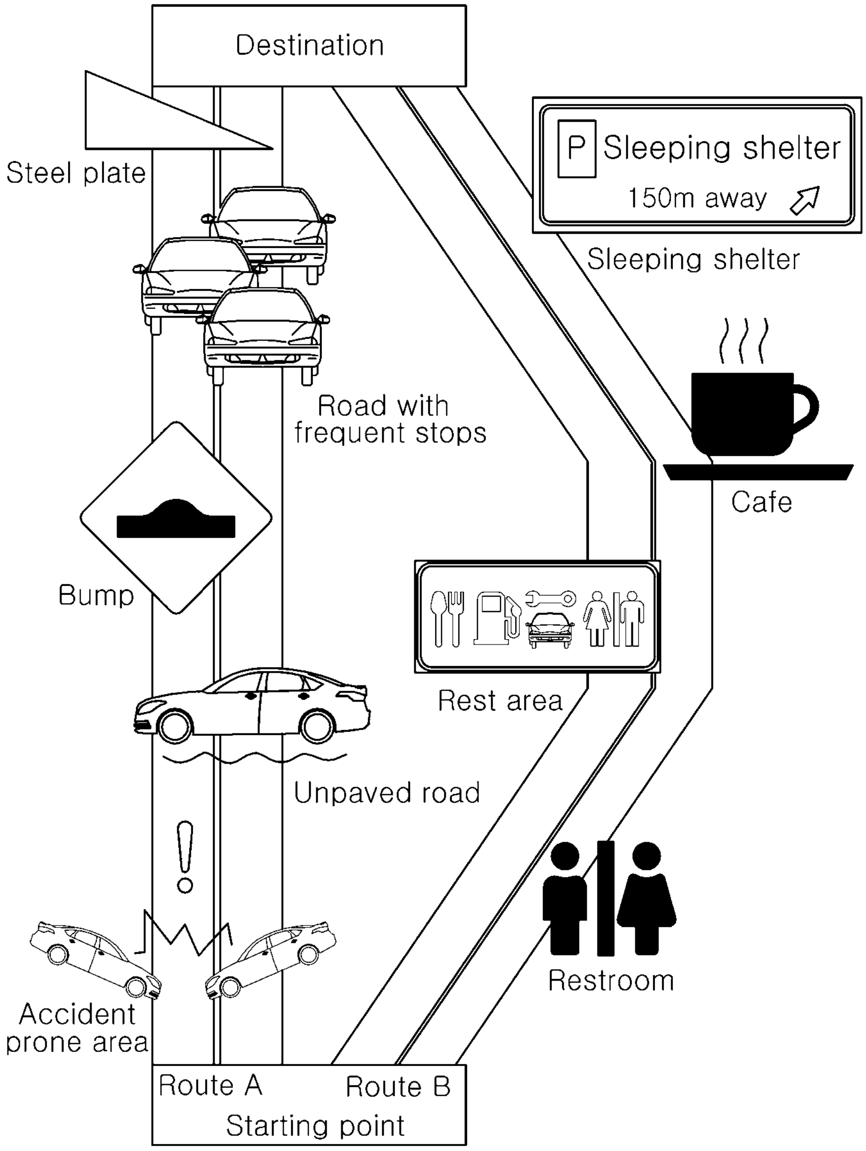
FIG. 13 is a diagram illustrating a fatigue influencing factor on a route according to an exemplary embodiment of the present disclosure.

FIG. 13 is a diagram illustrating a fatigue influencing factor on a route according to the embodiment.

Referring to FIG. 13, between a starting point and a destination, fatigue inducing factors are variously distributed in a route A, and fatigue reducing factors are variously present in a route B. In the instant case, a pregnant woman will feel less tired when she arrives at her destination by driving along the route B rather than the route A. Of course, when in the case of the route B, a distance or required time increases by a predetermined ratio or more compared to the route A, the route A may be taken.

For the present route selection, fatigue inducing factors and fatigue reduction factors may be scored/indexed and used in AVNT 210 to determine a route. This will be described with reference to FIG. 14.

Figure 14:
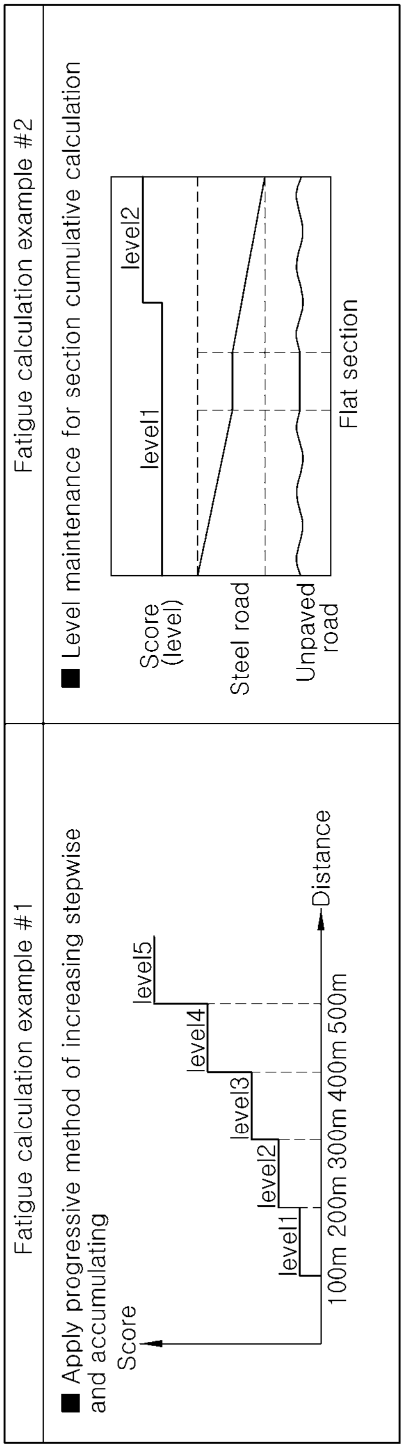
FIG. 14 illustrates an example of a fatigue calculation form according to the embodiment.

FIG. 14 illustrates an example of a fatigue calculation form according to the embodiment.

In indexing fatigue, as the distance and angle of a steel plate section increase, a fatigue index may increase. The fatigue index may increase linearly or may increase progressively by increasing stepwise according to the accumulation of the index as illustrated at the left graph of FIG. 14.

The indices of unpaved roads and roads with frequent stops may progressively increase in a stepwise fashion according to the distance of a section, and the indices of accident-prone areas and roads with bumps may progressively increase in a stepwise fashion according to the number of bumps existing within a predetermined distance.

In the method of increasing progressively stepwise increasing illustrated in the left graph of FIG. 14, the section of each level may be variably preset according to the biometric information of a pregnant woman, that is, time information. Even if there is a section in which there is no fatigue inducing factor, for example, a flat section illustrated at the right graph of FIG. 14, a level before entering the corresponding section may be maintained when the length of the corresponding section is a predetermined value or less.

Meanwhile, scoring of a fatigue reduction factor may be performed as follows.

First, a fatigue index may decrease according to the number of fatigue reduction factors (e.g., rest spaces) based on a route. In the instant case, fatigue index reduction values may be differentiated according to the positions of the fatigue reduction factors. For example, as a fatigue reduction factor is located in a section with a higher fatigue index, a weight is provided thereto so that the fatigue index may be reduced. This will be described with reference to FIG. 15.

Figure 15:
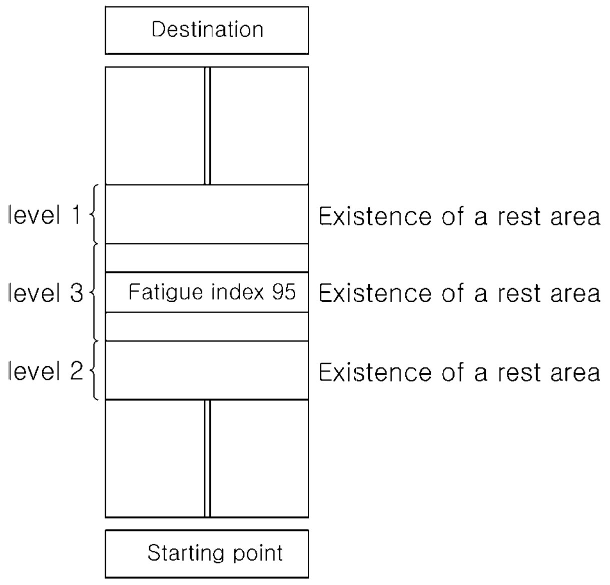
FIG. 15 is a diagram illustrating a fatigue index according to the embodiment.

FIG. 15 is a diagram illustrating a fatigue index according to the embodiment.

When there is a section with a highest fatigue index 95 in a route between a starting point and a destination as illustrated at the right side of FIG. 15, a rest space present in a section with the highest fatigue index even in the same type of rest spaces receives the weight of level 3, and fatigue index reduction is the biggest. The rest spaces before and after the section with the highest fatigue index may receive the lower weight of level 1 or level 2 decrease.

Figure 16:
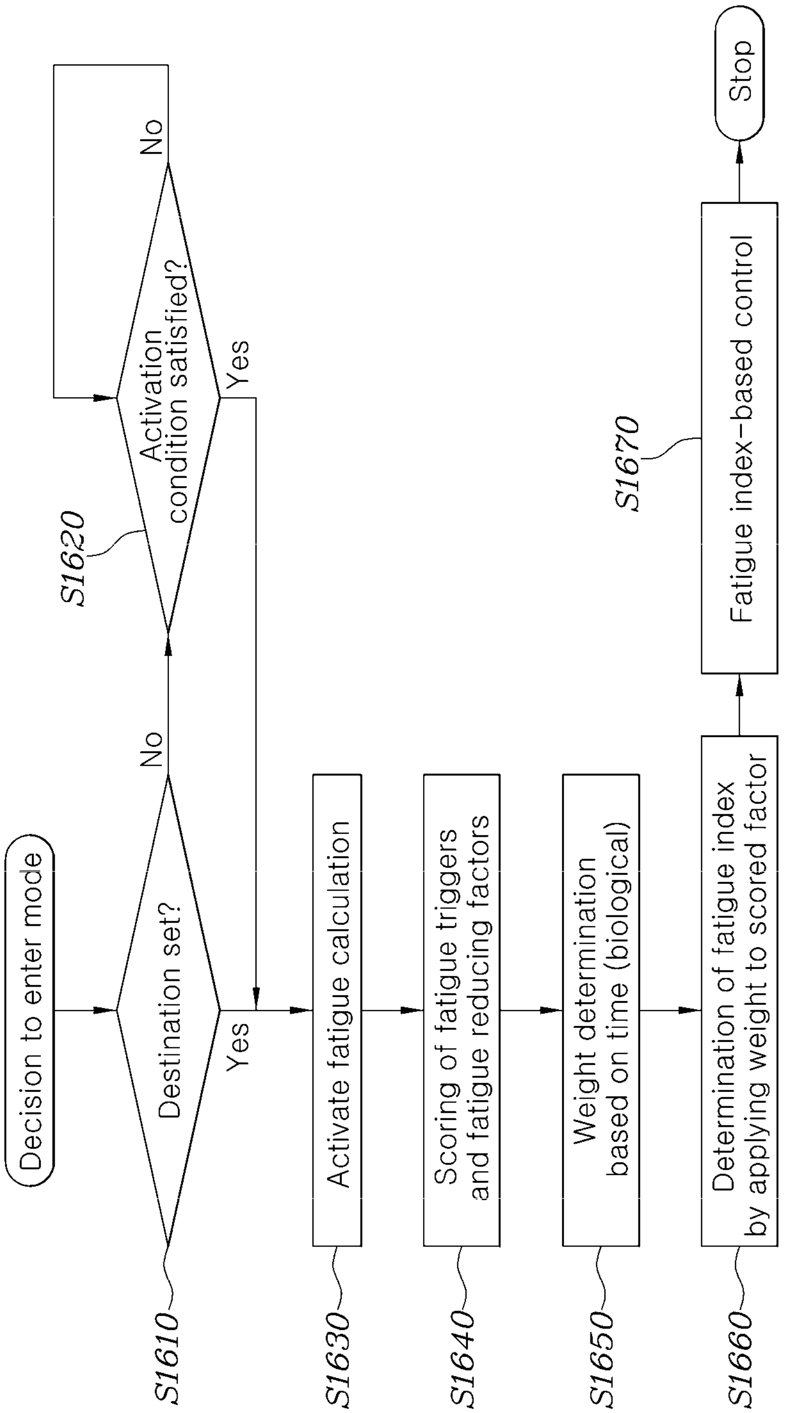
FIG. 16 is a flowchart illustrating an example of a process in which fatigue index-based control is performed according to the embodiment.

FIG. 16 is a flowchart illustrating an example of a process in which fatigue index-based control is performed according to the embodiment.

Referring to FIG. 16, depending on whether a destination is preset in the pregnant woman mode at S1610, fatigue calculation may be activated according to whether an activation condition is satisfied at S1620 or immediately at S1630.

Here, when a destination is not preset (No at S1610), the activation condition may be different according to biometric (time) information. For example, when the time information corresponds to the first trimester of pregnancy or the third trimester of pregnancy, the fatigue calculation may be performed with the pregnant woman mode entry, and when the time information corresponds to the second trimester of pregnancy, in a case in which the level of a preset parameter is a predetermined level or more, the fatigue calculation may be activated. Unlike this, even when cumulative running time is a preset value or more for each of time information, the fatigue calculation may be activated.

When the fatigue calculation is activated at S1630, a fatigue inducing factor and a fatigue reducing factor may be scored at S1640. Here, when a destination is preset, it is possible to score each factor for each route by determining at least one candidate route between a current location and the destination. Unlike this, when a destination is not preset, an expected destination is preset based on a past driving history (e.g., based on learning or big data) to determine at least one candidate route for the expected destination, or to score each factor for a predetermined distance ahead.

When the scoring of a factor for each candidate route is performed, the determination of a time-based (biometric) weight may be performed for each factor at S1650. For example, as described above, different weights may be applied to fatigue reduction factors according to the location of a rest space for each route. Furthermore, in relation to fatigue inducing factors, in the case of the first trimester of pregnancy, a weight for unpaved roads or bumps may increase, in the case of the second trimester of pregnancy, a weight for each factor may decrease, and in the third trimester of pregnancy, a weight for an acceleration/deceleration influence factor may be increased.

When a weight is applied to each factor, a final fatigue index for each route may be determined at S1660, and fatigue index-based control such as recommending a route with the lowest fatigue index or proposing a rest point may be performed at S1670.

Figure 17:
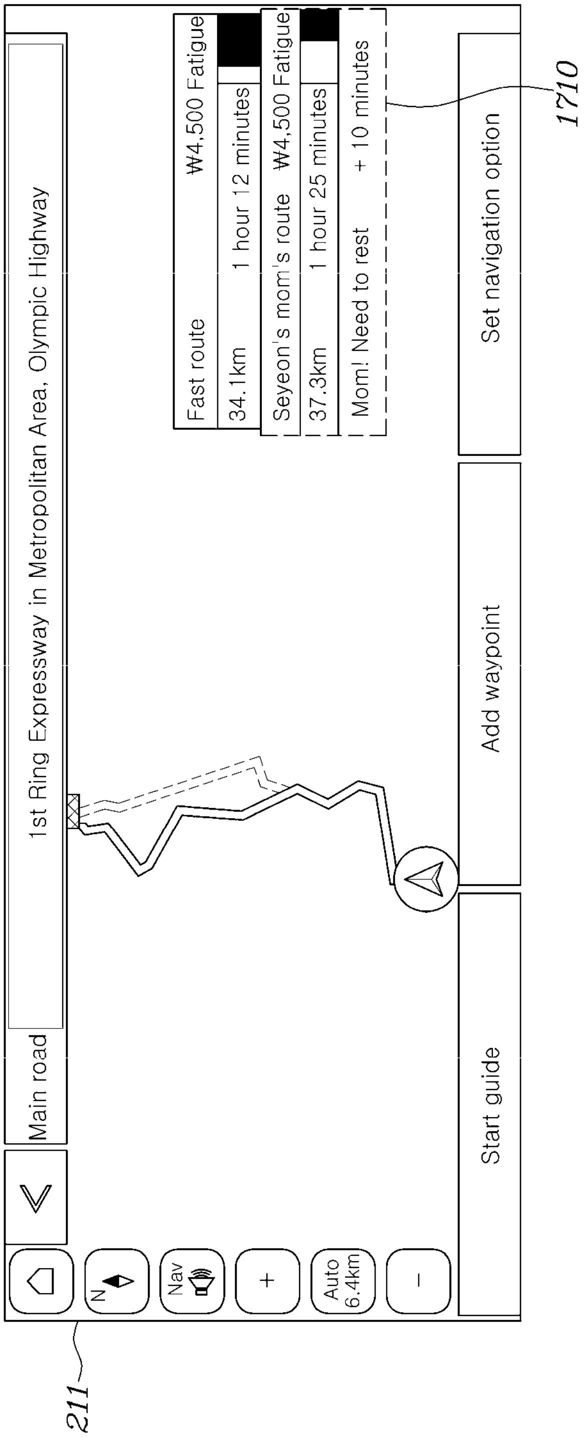
FIG. 17 illustrates an example of a route proposal form according to the embodiment.

FIG. 17 illustrates an example of a route proposal form according to the embodiment.

Referring to FIG. 17, in providing a route to a destination through the display device 211 of the AVNT terminal 210, a route 1710 derived as a result of determining fatigue according to a pregnant woman mode may be provided along with a general optimal route. The corresponding route information 1710 may further provide information related to a recommended period of rest time.

Next, a pedal (APS, BPS) correction function will be described with reference to FIGS. 18A, 18B, 18C and 19.

Figure 18A:
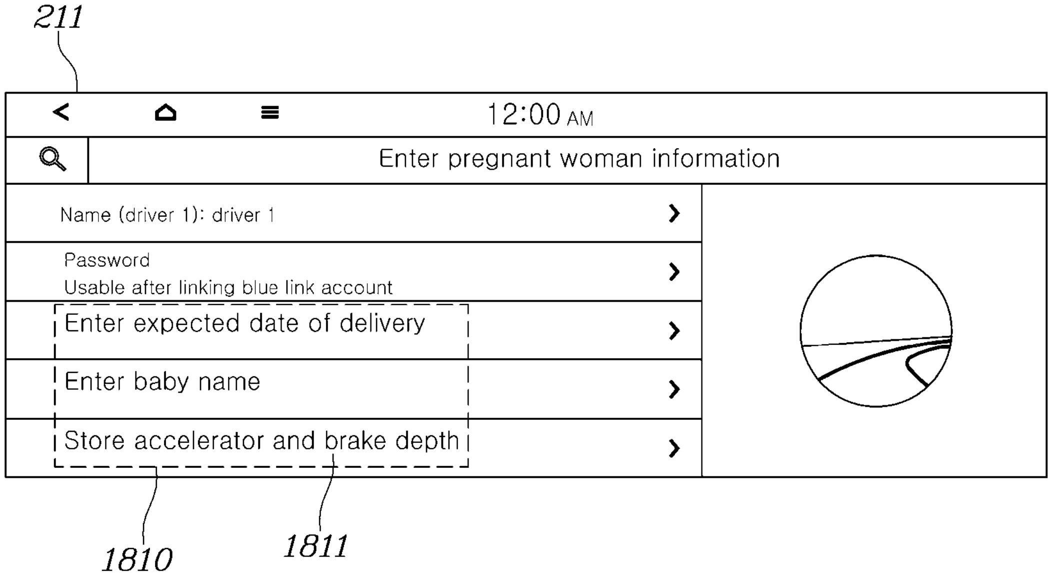
FIG. 18A illustrates an example of a form of a pedal correction function setting menu according to the exemplary embodiment of the present disclosure.
Figure 18B:
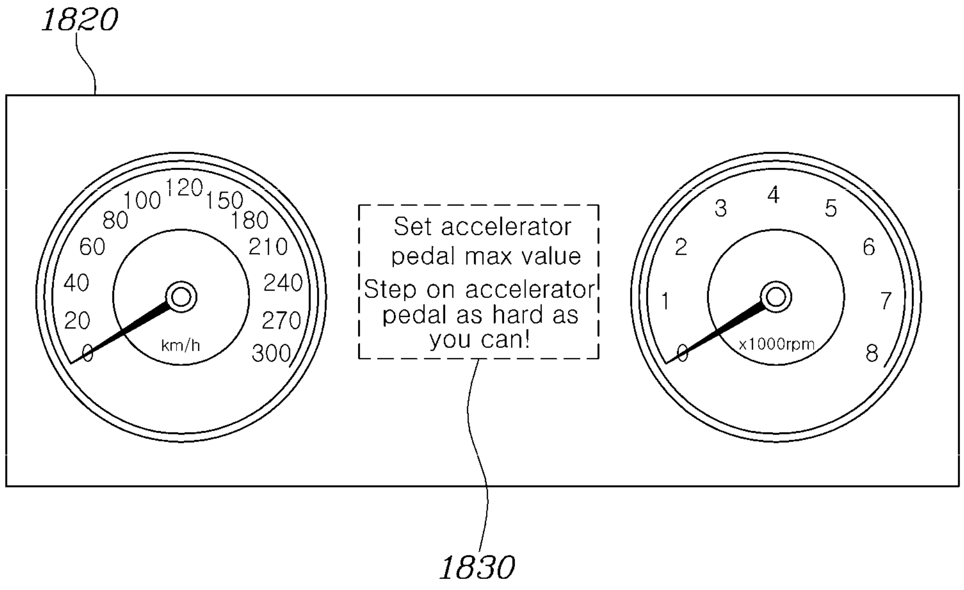
FIG. 18B illustrates an example of a form of a guidance for inputting a maximum pedal value.
Figure 18C:
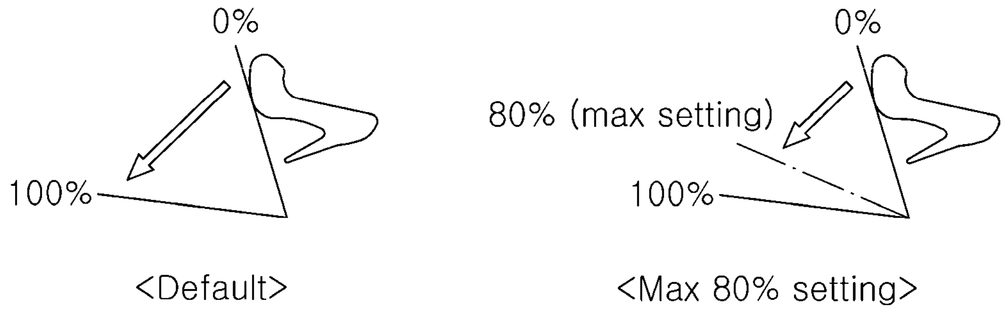
FIG. 18C illustrates an example of a form in which pedal correction is applied.

FIG. 18A illustrates an example of a form of a pedal correction function setting menu according to the exemplary embodiment of the present disclosure, FIG. 18B illustrates an example of a form of a guidance for inputting a maximum pedal value, and FIG. 18C illustrates an example of a form in which pedal correction is applied.

Referring to FIG. 18A, a pregnant woman information input menu 1810 may be provided through predetermined menu manipulation. The pregnant woman information input menu 1810 may include items such as an expected date of birth, a baby's name, and a pedal depth saving 1811.

When the item of the pedal depth saving 1811 is selected, a message 1830 requesting a driver to input a maximum manipulation value for each pedal through a test may be displayed on a cluster display 1820 as illustrated in FIG. 18B. During pedal manipulation for the pedal depth saving, a shifting stage is automatically controlled to a P stage or that the present function may be entered only in the P stage, but is not necessarily limited thereto. Furthermore, during the pedal depth saving, the driving source may not respond to an APS value. That is, the upper controller 250 may be configured for controlling the driving source or braking source not to operate according to an APS or BPS value input during an actual measurement mode.

As illustrated at the left of FIG. 18C, in a default setting, according to the actual pedal operation range (0~100%), the APS or BPS value is used to determine required torque for the driving source or required braking force for the braking source. Unlike this, during the outputting of the message 1830 illustrated in FIG. 18B, when the maximum depth of a pedal depressed by a driver is 80% as illustrated at the right in FIG. 18C, a maximum manipulation value for the pedal is 80%, so that the actual value of 80% may be interpreted as 100% when determining the required torque or required braking force. Furthermore, an actual value between 0 and 80% may be corrected through appropriate scaling to a value between 0 and 100%.

In relation to the pedal manipulation amount correction function, when a driver does not preset a maximum manipulation value for each pedal by actually stepping on the pedal, the maximum manipulation value for each pedal may be preset based on a seat position thereof. For example, the pedal manipulation amount correction function may be performed based on a table or map in which a maximum manipulation value of a pedal for each moving distance relative to a maximum forward position on a seat rail of a driver's seat is preset.

Furthermore, the setting of a maximum manipulation value for each pedal may induce updating by a driver based on time or context. For example, in the middle or late stage of pregnancy in which a fetus grows significantly in a time-based case, when acceleration or deceleration by pedal manipulation is reduced compared to a driver's tendency according to learning in a context-based case, or when a manipulation value exceeding a currently set maximum manipulation value occurs more frequently than the frequency of a predetermined level, the message 1830 illustrated in FIG. 18B may be output more frequently during the stopping of a vehicle.

Figure 19:
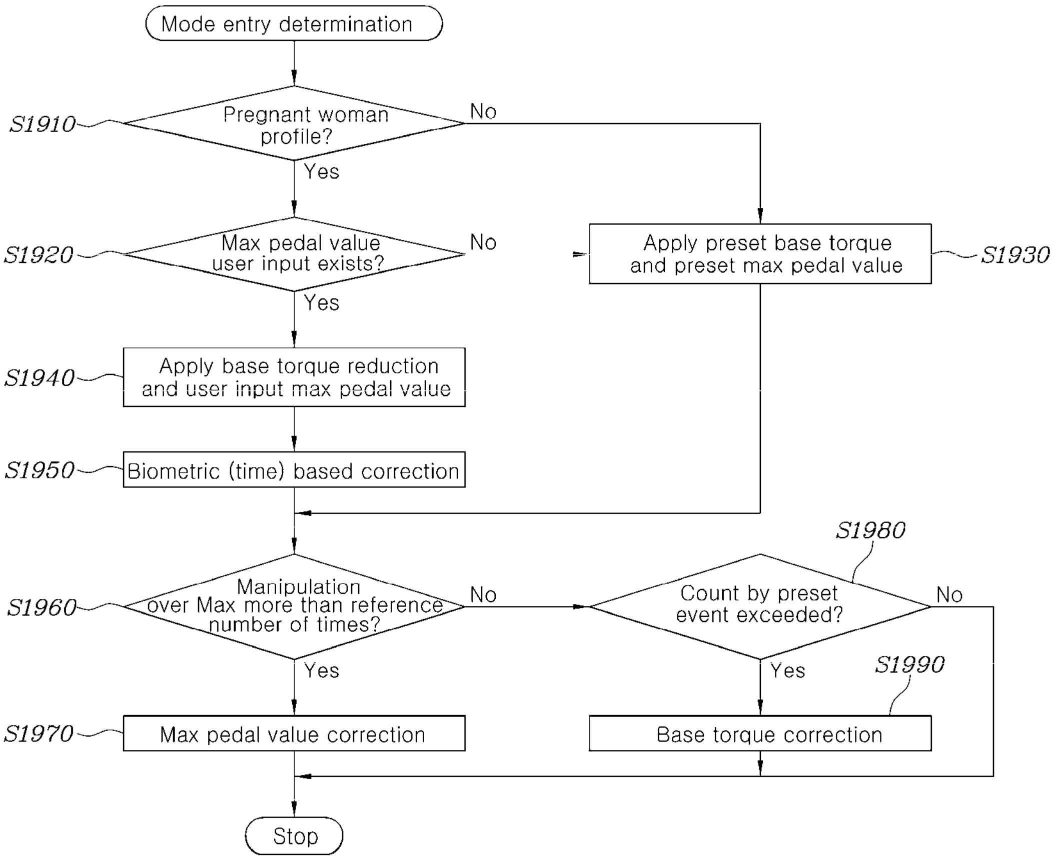
FIG. 19 is a flowchart illustrating an example of a process in which a pedal correction function is performed according to the embodiment.

FIG. 19 is a flowchart illustrating an example of a process in which a pedal correction function is performed according to the embodiment.

Referring to FIG. 19, in the pregnant woman mode, according to whether to select a profile (i.e., a pregnant woman profile) in which the pregnant woman item is preset in the AVNT terminal 210 at S1910, a differentiated base torque and a maximum manipulation value for each pedal (hereinafter, referred to as "a max pedal value" for convenience) may be applied. Here, the differentiated base torque may mean reducing a base torque. For example, a driver's requested torque mapped for APS manipulation may be decreased. The reduction of the base torque may be performed in a method of ratio scaling, or in a method of limiting a maximum value or a change rate, but is not limited to a specific method.

In a case in which a pregnant woman profile is selected (Yes at S1910), when there is a history of inputting the max pedal value according to guidance as in FIG. 18B (Yes at S1920), the max pedal value entered together with the base torque reduction may be applied to powertrain control at S1940. The max pedal value may be corrected according to biometric (time) information at S1950.

Unlike this, when a pregnant profile is not selected (No at S1910), or when the pregnant woman profile is selected (Yes at S1910) but there is no history of inputting the max pedal value (No at S1920), a base torque and a max pedal value preset for the pregnant woman mode may be applied. In the instant case, when the pregnant woman profile is selected (Yes at S1910) but there is no history of inputting the max pedal value (No at S1920), different max pedal values may be applied according to the progress of pregnancy (the first/second/third trimester).

When a pedal value greater than a max pedal value is detected more than a predetermined reference number of times in a state in which the max pedal value is applied (Yes at S1960), the max pedal value may be corrected at S1970. Because this may mean that the currently applied max pedal value is insufficient as a maximum value, the max pedal value may be corrected in an increasing direction, but is not necessarily limited to this direction.

When a pedal value greater than a max pedal value is not detected more than a predetermined reference number of times in a state in which the max pedal value is applied max (No at S1960 but a preset count for each event exceeds the reference number at S1980, the base torque may be corrected at S1990. The preset event count may be a surprise event count or an acceleration limit count, but is not necessarily limited thereto. For example, the base torque may be adjusted downward when the surprise count increases due to a pregnant driver's greater-than-expected acceleration or the count reaching the acceleration limit increases.

Next, the acceleration/deceleration limiting function in the pregnant woman mode will be described.

When a driver manipulates an accelerator pedal in a situation such as when a gear shift is at a low level or vehicle speed is low, or at a powertrain operating point including a large maximum torque, relatively large pitching may occur, and thus acceleration limit may be strengthened. Unlike this, when a driver manipulates an accelerator pedal in a situation such as when a gear shift is at a high level or vehicle speed is high, or at a powertrain operating point including a small maximum torque, an acceleration performance may not be secured, so that the acceleration limit may be relaxed. In the present way, in limiting acceleration, it is preferable to determine the limiting of acceleration suitable for a situation according to the change amount in APS.

Furthermore, the limiting of acceleration or deceleration is preferably performed so that the upper body of a pregnant woman is not tilted forward to reduce pressure on the abdomen of the pregnant woman. This will be described with reference to FIG. 20.

FIG. 20 is a diagram illustrating a form of control for relieving abdominal pressure due to acceleration according to the embodiment.

First, as illustrated at the upper side of FIG. 20, when an electrified vehicle configured for regenerative braking drives on a steel road, acceleration is prevented by increasing the amount of regeneration according to vehicle speed in the pregnant woman mode compared to the amount of regeneration according to vehicle speed in default control (i.e., when the pregnant woman mode is not applied).

Furthermore, as illustrated at the lower side of FIG. 20, when regenerative (creep) torque changes rapidly, such as in a tip-out situation in which accelerator pedal manipulation is suddenly released, the tilting of body may be alleviated by limiting a torque change rate.

Next, the steering correction function such as emergency steering limit will be described with reference to FIG. 21 and FIG. 22.

Figure 21:
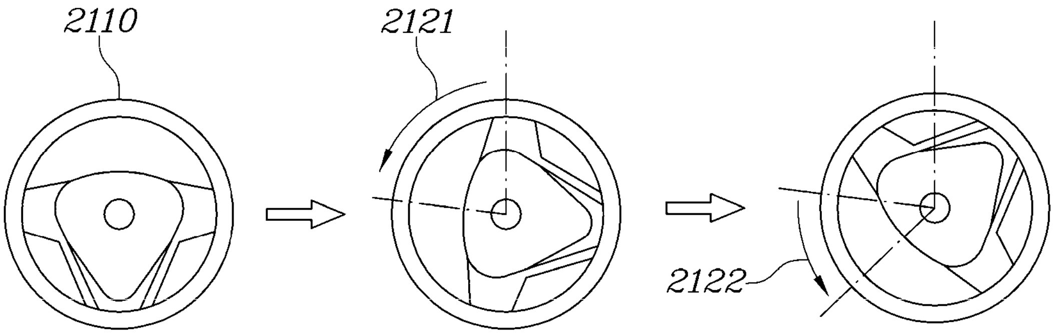
FIG. 21 is a diagram illustrating the concept of steering angle limitation according to the embodiment.
Figure 22:
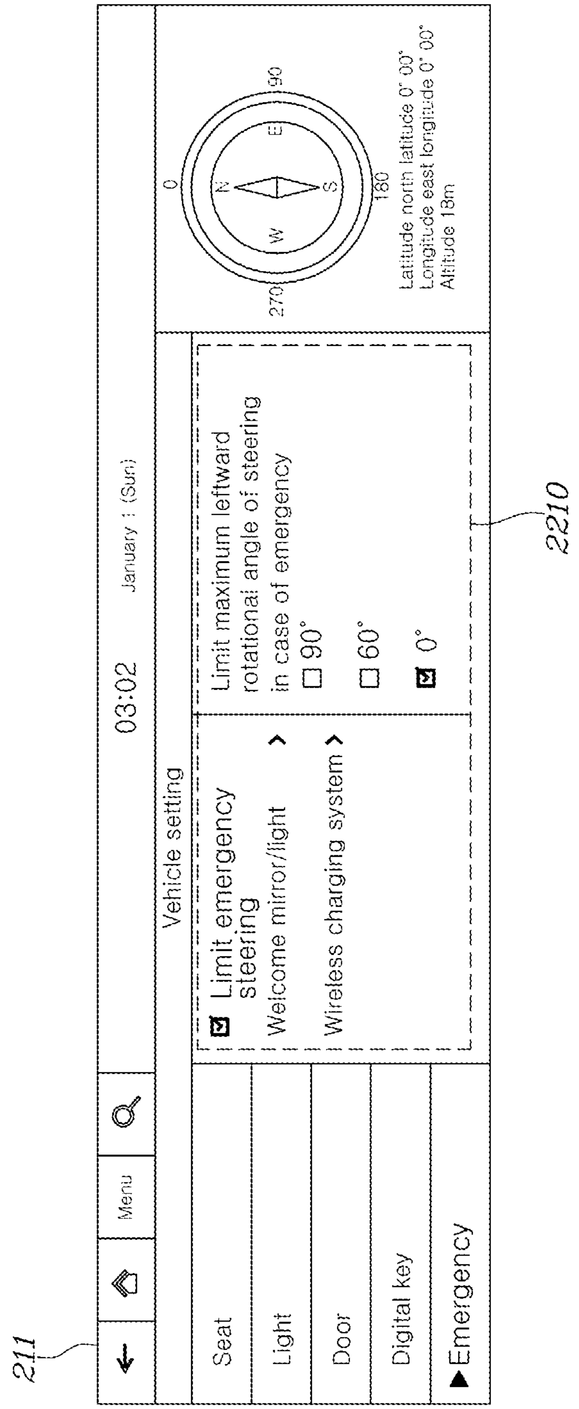
FIG. 22 illustrates an example of an emergency steering limit setting menu form according to the embodiment.

FIG. 21 is a diagram illustrating the concept of steering angle limitation according to the exemplary embodiment of the present disclosure, and FIG. 22 illustrates an example of an emergency steering limit setting menu form according to the embodiment.

Referring to FIG. 21, when the rotation 2121 of the steering wheel 2110 is performed by a steering angle to reach a limited lateral acceleration that adversely affects the fetus at a current vehicle speed when the pregnant woman mode is preset, the steering controller 240 may be configured for controlling the subsequent rotation 2122 of the steering wheel to reduce an effect on the steering angle. Here, the limited lateral acceleration for each vehicle speed may apply a value from a table or map determined in advance through a test.

For example, assuming that a steering angle is 45 degrees when a steering wheel turns 540 degrees and a critical lateral acceleration is reached when the steering wheel turns about 90 degrees at the vehicle speed of 60 kph, the change of the steering angle compared to the manipulation of the steering wheel may be reduced for steering of the steering wheel exceeding 90 degrees.

Furthermore, sensitivity may be corrected for each time. For example, in the case of the third trimester of pregnancy, a pregnant woman experiences the greatest difficulty in steering manipulation, so that the increasing form of the steering angle compared to the same steering angle may be corrected.

Next, when it is determined that a pregnant woman is sitting in a passenger seat, the restriction of steering manipulation in an emergency (e.g., forward collision assistance operation, etc.) may be activated, and the amount of the restriction may be selected through a menu illustrated in FIG. 22. For example, when the pregnant woman item is not preset in a selected driver profile, but a mobile phone linked to a profile in which the pregnant woman item is preset is detected inside a vehicle and an additional occupant is detected in a front passenger seat other than a driver's seat through an airbag sensor, it may be determined that a pregnant woman is seated in the front passenger seat, but this is not limiting.

Referring to FIG. 22, in relation to the emergency steering limit function, a menu 2210 for selecting a left maximum allowable rotation angle may be provided. In the instant case, the ADAS controller 230 may be configured to determine whether or not an emergency situation exists (e.g., when remaining time period until collision is less than a preset time period when a current driving state is maintained), and may release the function when it is determined that collision avoidance is possible during steering to the left through steering rotation higher than steering rotation limit.

Next, an exercise guidance function for a pregnant woman will be described.

Because it is helpful for a pregnant woman to maintain a level of fitness for the health of both the fetus and herself, the exercise guidance function may support the pregnant woman's steady exercise. A pregnant driver may perform an exercise selected by a driver setting, and a differentiated exercise may be guided according to biometric (time) information stored in a user profile. For example, in the case of a pregnant woman in the early stage of pregnancy, seat position adjustment and a driver's seat leg supporter may be used to induce a light muscle exercise for the lower body. For another example, in the case of a pregnant woman in the middle of pregnancy, it is easiest to be active and the fetus develops rapidly, so stretching guidance may be performed to reduce muscle fatigue and control breathing. Furthermore, in the case of late pregnancy, an exercise through the steering wheel torque control of an electronic steering device may be guided to induce the activity of the upper body.

Figure 23A:
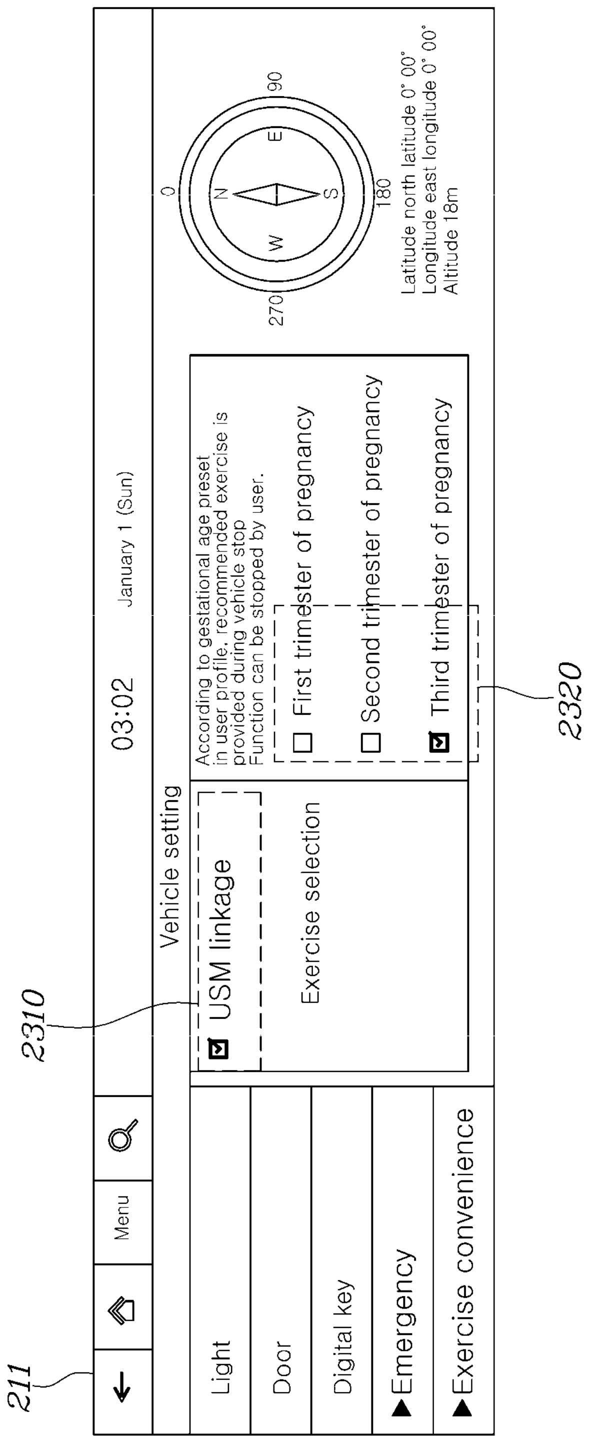
FIG. 23A and FIG. 23B are diagrams illustrating an exercise guidance function according to an exemplary embodiment of the present disclosure.
Figure 23B:
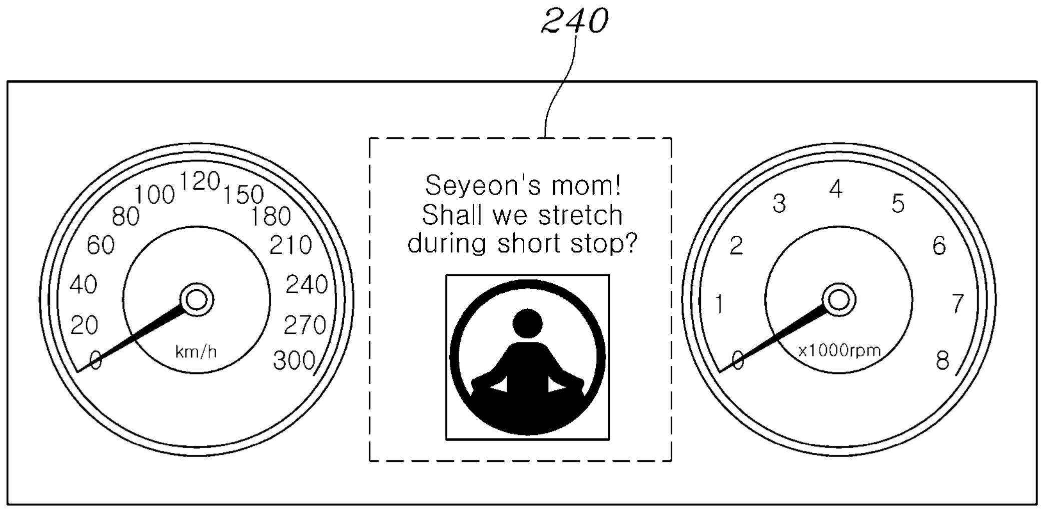

FIG. 23A and FIG. 23B are diagrams illustrating the exercise guidance function according to an exemplary embodiment of the present disclosure.

First, referring to FIG. 23A, in the display device 211 of the AVNT terminal 210, a type of exercise may be selected through a user setting menu (USM) linked item 2310, or a recommended exercise may be guided through the input of a setting 2320 for each time.

When the exercise guidance function for a pregnant woman is preset, as illustrated in FIG. 23B, exercise guide information 2410 may be output in a predetermined form in a situation in which exercise is possible while riding (e.g., a stop in a P stage, etc.). As illustrated in FIG. 23B, the exercise guide information 2410 may be output in a predetermined form in a situation in which exercise is possible while an occupant is boarding (e.g., during the stopping of a vehicle at a stage P).

Figure 24:
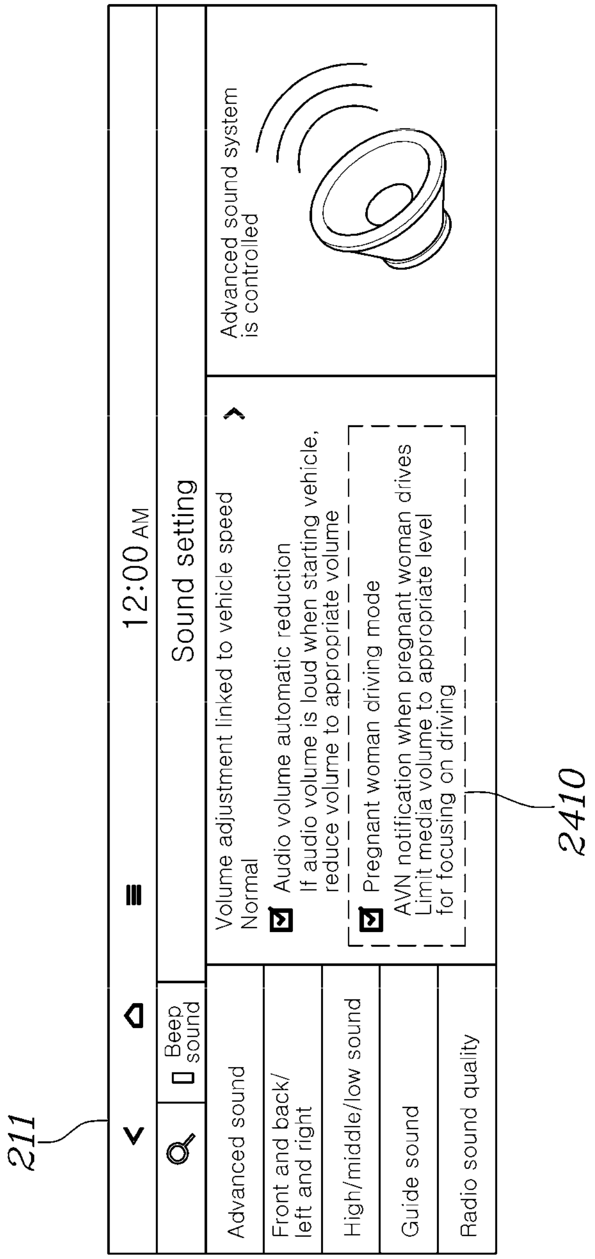
FIG. 24 illustrates an example of a volume limit setting menu form according to the embodiment.

FIG. 24 illustrates an example of a volume limit setting menu form according to the embodiment.

Referring to FIG. 24, in the display device 211 of the AVNT terminal 210, a sound setting menu in relation to a sound limiting function may provide an item 2410 for setting the function of limiting the maximum volume of a notification sound or a media sound to a preset value while a pregnant woman is driving.

Furthermore, the term related to a control device such as “controller”, “control apparatus”, “control unit”, “control device”, “control module”, or “server”, etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless stated otherwise, a singular expression includes a plural expression unless the context clearly indicates otherwise.

In exemplary embodiments of the present disclosure, “at least one of A and B” may refer to “at least one of A or B” or “at least one of combinations of one or more of A and B”. In addition, “one or more of A and B” may refer to “one or more of A or B” or “one or more of combinations of one or more of A and B”.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of supporting vehicle driving for a pregnant woman, the method comprising:

determining, by a controller, whether to enter a driving support control for the pregnant woman based on at least one of an entry command or an input biometric information of a driver who is the pregnant woman;

determining, by the controller, a control function to be activated among predetermined control functions in the driving support control for the pregnant woman based on the at least one of the entry command or the biometric information when entering the driving support control for the pregnant woman; and performing, by the controller, the determined control function, wherein the determining of the control function includes determining the control function to be activated and a functional priority among the control function to be activated is determined based on one of predetermined periods of pregnancy, wherein the one of predetermined periods of pregnancy is determined based on the biometric information including at least one of a date of conception, a number of days elapsed from the date of conception, an expected date of delivery, a gestational age, a trimester of pregnancy or estimation-based information thereof, wherein the predetermined control functions include providing a route determined based on at least one fatigue-inducing factor and at least one fatigue-reducing factor in at least one candidate route, wherein a weight applied to the at least one fatigue-reducing factor is determined based on a fatigue index level at a position of the fatigue-reducing factor in the at least one candidate route, and wherein a weight applied to each of the fatigue-inducing factor and the fatigue-reducing factor is further adjusted based on the one of predetermined periods of pregnancy.

2. The method of claim 1, wherein the determining of the control function includes determining control parameters based on the at least one of the entry command or the biometric information, and wherein in the performing of the determined control function, the determined control function is performed based on the determined control parameters.

3. The method of claim 2, further including:

changing, by the controller, at least one of the control function or the control parameters based on whether the biometric information is changed.

4. The method of claim 2, wherein the determining of the control function includes:

determining entry into the driving support control for the pregnant woman according to the entry command of the driver; and determining the control function and the control parameters according to a default setting when the biometric information does not exist.

5. The method of claim 4, further including:

correcting, by the controller, the control parameters according to the default setting based on change in a situation during vehicle driving.

6. The method of claim 4, wherein the default setting is performed based on a preset period during an entire pregnancy period.

7. The method of claim 1, wherein the determining of whether to enter the driving support control includes determining whether the pregnant woman is boarded based on at least one of a user profile in which a pregnant woman item is capable of being preset or an occupant posture information.

8. The method of claim 7, further including:

waiting for, by the controller, a confirmation input on whether the pregnant woman is boarded when the controller concludes that the pregnant woman is boarded; and determining whether to enter the driving support control for the pregnant woman based on the confirmation input.

9. The method of claim 2, wherein the determining of the control function includes presetting at least one of the functional priority of the control function, a correction sensitivity to control correction frequency or correction width for each of the control parameters, and a computational sensitivity to assign a weight to each of the control parameters according to the biometric information.

10. The method of claim 9, wherein the determining of the control function includes determining a set of settings corresponding to the biometric information among a plurality of preset sets of settings, and wherein each of the plurality of sets of settings is preset to be different from each other in at least one of the functional priority, the correction sensitivity, or the computational sensitivity.

11. The method of claim 2, wherein the determining of the control function includes determining levels of the control parameters based on at least one of whether an event has occurred for each of the control parameters, a number of event occurrences, a sensor value, a device state value, or a reference value for each parameter.

12. A non-transitory computer-readable recording medium recording a program for executing the method of supporting vehicle driving for the pregnant woman of claim 1.

13. The method of claim 1, wherein the predetermined control functions further include adjusting an effect of steering wheel rotation on a steering angle based on the biometric information.

14. A vehicle comprising:

an input device configured to receive a command from a user; and a controller communicatively connected to the input device and configured to determine whether to enter a driving support control for a pregnant woman based on at least one of an entry command or a biometric information input through the input device and to determine a control function to be activated among predetermined control functions in the driving support control for the pregnant woman based on the at least one of the entry command or the biometric information when entering the driving support control for the pregnant woman to perform the determined control function, wherein the controller is further configured to determine the control function to be activated and a functional priority among the control function to be activated based on one of predetermined periods of pregnancy, wherein the one of predetermined periods of pregnancy is determined based on the biometric information including at least one of a date of conception, a number of days elapsed from the date of conception, an expected date of delivery, a gestational age, a trimester of pregnancy or estimation-based information thereof, and wherein the controller is further configured to provide a route determined based on at least one fatigue-inducing factor and at least one fatigue-reducing factor in at least one candidate route, wherein a weight applied to the at least one fatigue-reducing factor is determined based on a fatigue index level at a position of the fatigue-reducing factor in the at least one candidate route, and wherein a weight applied to each of the fatigue-inducing factor and the fatigue-reducing factor is further adjusted based on the one of predetermined periods of pregnancy.

15. The vehicle of claim 14, wherein the controller is further configured to determine control parameters based on at least one of the entry command or the biometric information and to perform the determined control function based on the determined control parameters.

16. The vehicle of claim 15, wherein the controller is further configured to change at least one of the control function or the control parameters based on whether the biometric information is changed.

17. The vehicle of claim 15, wherein the controller is further configured to determine entry into the driving support control for the pregnant woman according to the entry command of the driver who is the pregnant woman, and is configured to determine the control function and the control parameters according to a default setting when the biometric information does not exist.

18. The vehicle of claim 17, wherein the controller is further configured to correct the control parameters according to the default setting based on change in a situation during vehicle driving.

19. The vehicle of claim 17, wherein the default setting is performed based on a preset period during an entire pregnancy period.

20. The vehicle of claim 14, wherein the controller is further configured to adjust an effect of steering wheel rotation on a steering angle based on the biometric information.

* * * * *